US009129248B2

(12) United States Patent  (10) Patent No.: US 9,129,248 B2
Reynolds et al.  (45) Date of Patent:  Sep. 8, 2015

(54) KINEMATIC ASSET MANAGEMENT

(71) Applicant: Trimble Navigation Limited, Sunnyvale, CA (US)

(72) Inventors: James C. Reynolds, San Jose, CA (US); Gary Dennis, Duluth, GA (US); Prakash Iyer, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 124 days.

(21) Appl. No.: 13/750,750

(22) Filed: Jan. 25, 2013

(65) Prior Publication Data

US 2014/0209676 A1  Jul. 31, 2014

(51) Int. Cl.
*G06Q 30/00* (2012.01)
*G06Q 10/08* (2012.01)

(52) U.S. Cl.
CPC .................... *G06Q 10/087* (2013.01)

(58) Field of Classification Search
CPC ... G06Q 10/08; G06Q 10/06; G06Q 10/0833; G06Q 10/087; G06Q 50/28; B60R 25/1025; G06F 17/30; G06F 17/30241; G06F 17/30598; G07C 5/008; G08B 13/2402; G08B 21/24
USPC .................. 235/385, 375, 383, 381, 492, 493
See application file for complete search history.

(56) References Cited

U.S. PATENT DOCUMENTS

| | | | |
|---|---|---|---|
| 8,902,760 B2 * | 12/2014 | Austermann et al. | 370/241 |
| 2006/0031259 A1 * | 2/2006 | Gibson et al. | 707/104.1 |
| 2006/0208890 A1 * | 9/2006 | Ehrman et al. | 340/572.1 |
| 2007/0120736 A1 * | 5/2007 | MacKenzie et al. | 342/357.07 |
| 2008/0068170 A1 * | 3/2008 | Ehrman et al. | 340/572.1 |
| 2009/0115609 A1 * | 5/2009 | Weaver | 340/572.1 |
| 2009/0198371 A1 * | 8/2009 | Emanuel et al. | 700/226 |
| 2012/0033850 A1 * | 2/2012 | Owens et al. | 382/100 |

FOREIGN PATENT DOCUMENTS

| | | |
|---|---|---|
| JP | 2004295406 A | 10/2004 |
| JP | 2008225751 A | 9/2008 |
| JP | 2012168833 A | 9/2012 |
| KR | 1020110106576 A | 9/2011 |
| WO | 2011050244 A1 | 4/2011 |

OTHER PUBLICATIONS

"PCT/US2014/013047 International Search Report", Sep. 5, 2014, 15 pages.

* cited by examiner

*Primary Examiner* — Thien M Le

(57) ABSTRACT

A system for managing kinematic assets is disclosed. In one embodiment, the system comprises an electronic identification device associated with an asset. The system further comprises a container comprising a reader disposed within the container for receiving a unique identification of the identification device. The container further comprises a reader node for maintaining an inventory record comprising the asset and for generating a report when the asset is not detected by said reader. The report further comprises a location of the container when said report is generated. The system further comprises a kinematic asset management platform comprising an asset registry for storing data conveyed by the report and a reports engine for generating a second report conveying the location of said container when the report is generated.

13 Claims, 12 Drawing Sheets

KINEMATIC ASSET MANAGEMENT

BACKGROUND

Currently, most large enterprises with field service operations and field service management responsibilities are inventorying and managing their assets (such as tools, test sets, circuit boards, set-top boxes, termite bait stations, network interface devices, employee ID badges, and satellite TV antennas) in various and sometimes inefficient ways. This asset inventory and location management has been restricted to standard warehouse buildings where manual inventory processes are used to track the status and location of items. Examples of currently used technology for inventorying and managing company assets at fixed sites, such as enterprise warehouses and store rooms, are bar code scanning, radio-frequency identification (RFID) tags, and manually prepared spreadsheets.

Assets used in a field service operation entering the field service company supply chain typically have excellent documentation, inventory, and accountability at the initial point of receipt, such as the central warehouse or at the organization that directly receives an item (e.g. the directly delivered test set). However, once there is movement of that asset beyond the initial point of entry into a field service company control, inventory, and accountability become a real problem regarding loss prevention, leakage, and lack of asset knowledge leading to overstock.

Companies, or organizations within an enterprise that deliver field service or that have technology driven services related infrastructure assets, usually receive products and materials in their central warehouse. However, there is ample opportunity for inventory failure and accountability which, unfortunately applies to both high value and low value product and materials. In some cases, certain products and materials, such as a needed test set, are shipped directly from the supplier to a work center location where that item may be used or distributed further to field service technicians. In those situations accountability and inventory are distributed and even more difficult for a field service operation to manage.

Today field service operations, whether they are involved in communications services, heating-ventilation-air conditioning (HVAC) services, plumbing services, or termite control services, have field service technicians or engineers that have assets which go in motion, i.e. become "kinematic." The very nature of "field service" means that technicians are out with customers and partners, i.e. "in the field." Today assets used by field service technicians are not tracked with the kind of precision needed for proper accountability and control. In some cases today, where companies have tried to implement accountability and control measures, increases in labor costs and human intervention have been known to cause errors and reduce the accuracy of these control measures.

SUMMARY

A system for managing kinematic assets is disclosed. In one embodiment, the system comprises an electronic identification device associated with an asset. The system further comprises a container comprising a reader disposed within the container for receiving a unique identification of the identification device. The container further comprises a reader node for maintaining an inventory record comprising the asset and for generating a report when the asset is not detected by said reader. The report further comprises a location of the container when said report is generated. The system further comprises a Kinematic asset management platform comprising an asset registry for storing data conveyed by the report and a reports engine for generating a second report conveying the location of said container when the report is generated.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Figure 1:
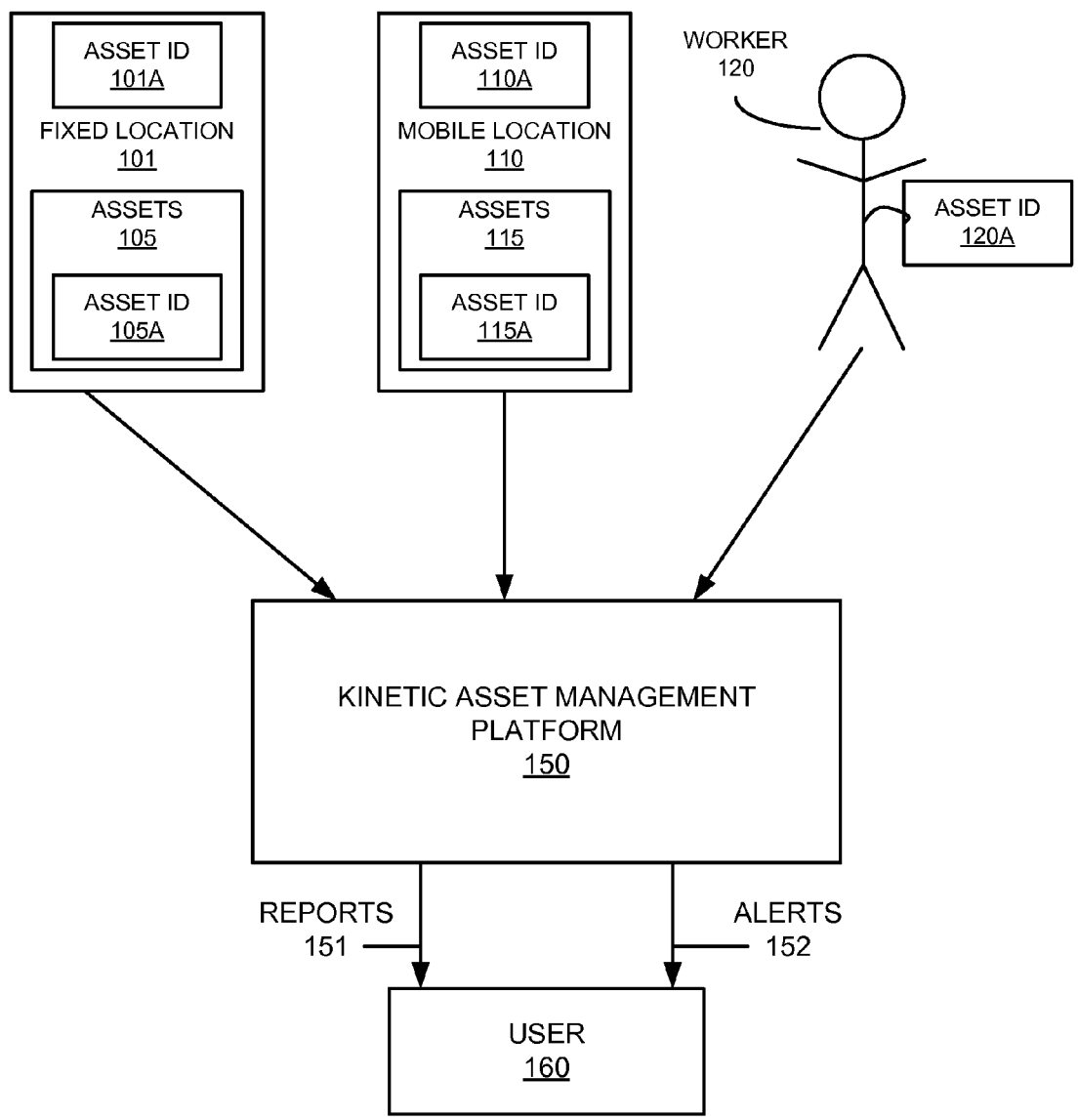
FIG. 1 shows an example Kinematic Asset Management System in accordance with various embodiments.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

NOTATION AND NOMENCLATURE

Unless specifically stated otherwise as apparent from the following discussions, it is appreciated that throughout the present Description of Embodiments, discussions utilizing terms such as "associating," "establishing," "maintaining," "transferring," "detecting," "reporting," "storing," "receiving," "determining," "disregarding," "using," "conveying," "generating," "displaying," "indicating," "including," "providing," "assigning," "accessing," or the like, often (but not always) refer to the actions and processes of a computer system or similar electronic computing device such as, but not limited to, a display unit and/or a lifting device sensor unit or component thereof. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Overview of Discussion

Example units, systems, and methods for kinematic asset management are described herein. Discussion begins with description of the terms asset and kinematic asset. Discussion continues with description of components comprising an enterprise-wide employment of a kinematic asset management system in accordance with various embodiments. Components of a kinematic asset management platform are then discussed. Discussion then turns to description of the concept of a moving warehouse/static warehouse in accordance with various embodiments. A High-value Equipment Loss Protection implementation is then discussed. An example Work-Worker-Asset implementation is then described. A method for compensating for detection shortcomings is then discussed. An example computer system is then discussed, with which or upon which various components, method procedures, or portions thereof may be implemented.

Assets and Kinematic Assets

Various embodiments implement a Kinematic Asset Management platform which can interact with an Inventory Management application for company assets that typically move via company vehicles from one company location to another company location, or to a customer location and provides multiple levels of improvements in managing company assets. As a result, not only is the warehouse inventory control extended far beyond the warehouse's walls and out into the entire fleet but the entire inventory monitoring process in that fleet is automated and continually running. The Kinematic Asset Management Platform can be integrated with or along side of enterprise asset management systems and asset inventory systems. For example, the Kinematic Asset Management Platform combined with an asset inventory application would result in a Kinematic Asset Inventory Management application.

In accordance with various embodiments, the term "asset", describes a company's equipment (tools, test equipment, etc.) and for a company's products and consumables (e.g. TV set top boxes, cable modems, other hardware). These are considered assets to the extent that their monetary or business process value warrants knowing where they are and thus they are assets worth monitoring. In addition to the above described category of assets, the term "asset" also describes the vehicles that carry them are themselves company assets. A vehicle is an asset that can contain other assets. Similar to vehicles, the term "asset" also describes a physical building which can itself be considered a company asset and it also can contain other assets. In accordance with various embodiments, the term "asset" also describes employees of a company. As with other assets, they too can move and also be contained inside of another asset (e.g. a driver in a van).

"Standard" assets, warehouses and vehicles are in this context treated generally the same and differ mostly in only several attributes. For example, a warehouse is an asset that can contain other assets, cannot move and is at a known/static location. A vehicle is an asset that can also contain other assets, but can move and whose location is dynamic, or kinematic, and can be determined using Global Navigation Satellite System (GNSS) receivers. A voltmeter is an asset that cannot contain other assets, but can move and whose location is not self-determined but is determined using a sensor/tag (e.g. RFID) that is read by another asset whose location is somehow known (e.g. warehouse or vehicle). Thus, in various embodiments, an "asset" can be anything/anyone owned, used, or employed by an entity.

In accordance with various embodiments, the term "kinematic asset" describes an asset whose location and/or container changes during the normal course of business. If an asset can be located geographically (e.g. with GNSS or in the case of a building or other immovable asset, at a fixed location) or can be located in or near another asset (e.g. with RFID), it can be interrelated with other kinematic and non-kinematic assets and events. In various embodiments, an entity's vehicles are considered warehouses just like the entity's buildings, or other fixed assets. They both are simply containers for other assets. So while a vehicle is considered a warehouse, it is also considered a kinematic asset. In other words, there is no technical difference between a warehouse building and a company vehicle other than a vehicular warehouse can move.

In accordance with various embodiments, a kinematic asset management platform is provided with can interact with asset positioning, inventory management, human resource, dispatch, work ordering, and field service operations components to monitor and manage kinematic assets for an entity. Various embodiments can interact with existing supply chain management and inventory control systems to facilitate inventory, management, and accountability of enterprise assets used in field service operations located in warehouses, depots, garages, and store rooms as the move from fixed storage sites (e.g., become kinematic) in an enterprise vehicle and return to the fixed site, or are potentially transferred to another enterprise vehicle. Various embodiments implement asset-identification technology such as RFID with Location Based Service (LBS) technology for enterprise vehicles to allow full asset management functions throughout an asset's lifecycle within an enterprise wherever the asset is moved. Kinematic asset management of enterprise assets that tend to go into the field can be isolated to enterprise vehicles and equipment in various embodiments. Alternatively, if an enterprise wants to monitor the full lifecycle of its assets and provide full integration of data, the enterprise can deploy the same technology applied to enterprise vehicles to warehouses, depots, store rooms, etc. in accordance with various embodiments. This would allow monitoring and managing fixed and mobile assets together.

In addition to providing inventory for all monitored areas (e.g., storerooms, vehicles, etc.) various embodiments implement a kinematic asset management platform (e.g., 150 of FIG. 1) can be used to address overstocking of inventory. As an example, some field technicians will intentionally overstock their vehicles to ensure that they do no run out of items while in the field. This excess inventory in turn carries a cost on the company books. In accordance with various embodiments, kinematic asset management platform 150 will provide to a user the level of inventory in the company's vehicle fleet which allows another system, or person, to determine whether a vehicle is overstocked with a given item. The kinematic asset management platform can also be used to facilitate product delivery verification. In accordance with various embodiments, kinematic asset management platform 150 will provide information to a user of what items have entered and left a vehicle and at what time of place. This information can be used by another system, or person, to verify that the correct items have been delivered to the correct location. Similarly, in various embodiments, kinematic asset management platform 150 can be used to ensure that all high-value equipment is on the vehicle when the vehicle leaves a work site. In one example, an inventory of what items, equipment, and personnel are in a vehicle when the vehicle leaves a work site can be provided to another system, or person, to facilitate determining whether all of the equipment is on the vehicle. By determining whether the correct personnel are also present, various embodiments can be used to determine whether the vehicle is being stolen as well.

In another embodiment, kinematic asset management platform 150 can be used to ensure that the correct equipment, items, and personnel are in the vehicle to begin that vehicle's scheduled service run. In other words, for the service stops scheduled for that vehicle on that day, kinematic asset management platform 150 will provide to another system, or person, a list of the equipment (e.g., test sets, tools, etc.) present on the vehicle before it begins its service schedule. This facilitates determining whether the vehicle is properly stocked for the service run it is about to begin. As a result, drivers will be less inclined to overstock their vehicles prior to beginning a service run. Also, kinematic asset management platform 150 can provide the identity of the driver of that vehicle as well. This can be provided to another system, or person, which can determine whether that driver is qualified to perform all of the services scheduled for that vehicle on a given day.

Enterprise-Wide Employment of a Kinematic Asset System

FIG. 1 shows an example Kinematic Asset Management System 100 in accordance with various embodiments. In FIG. 1, a fixed location 101 can be a warehouse, depot, garage, office, equipment room, or other facility which is at a fixed location. In the embodiment of FIG. 1, fixed location 101 is associated with, or described by, an asset identification 101A. As will be described in greater detail below, asset identifications such as 101A, 105A, 110A, 115A, 120A, etc. are used by a Kinematic Asset Management Platform (e.g., 150 of FIG. 1), to identify and monitor assets of an enterprise. As shown in FIG. 1, fixed location 101 further comprises an asset 105 which is located at fixed location 101. In the embodiment of FIG. 1, asset 105 is also associated with, or described by, a respective asset identification 105A. In FIG. 1, mobile location 110 comprises a vehicle such as a truck, car, construction vehicle, etc. used by an enterprise. Again, mobile location 110 is associated with, or described by, a respective asset identification 110A. In FIG. 1, system 100 further comprises a worker 120. As described above, in various embodiments assets can comprise locations, vehicles, equipment, consumables, and employees. Thus, in the embodiment of FIG. 1, worker 120 is associated with, or described by, a respective asset identification 120A. It is noted that in various embodiments, one or more asset may be associated with, or described by, a plurality of asset identifications.

In accordance with various embodiments, a respective asset identification is implemented using machine readable identification and detection technology. This can include, but is not limited to, RFID tags, barcodes, and cameras as well as manually entered data. It is noted that the term "RFID tag" can include a variety of technologies including, but not limited to, WiFi tags (e.g., compliant with the Institute of Electrical and Electronics Engineers (IEEE) 802.11 standards), RuBee tags (e.g., compliant with the IEEE 1902 standard), Bluetooth tags (e.g., compliant with the IEEE 802.15 standard), the IEEE 802.15.1 standard for personal area networks, ZigBee tags (e.g., compliant with the IEEE 802.15.4 standard), as well as other devices compliant with other implementations of the IEEE 802.15 standards for wireless personal area networks. In various embodiments, a respective asset identification can also be implemented using various barcode technologies such as a standard linear barcode, a stacked linear barcode a proximity barcode, a matrix 2D, barcode, or the like. In various embodiments, a respective asset identification can be captured using cameras or video equipment. In various embodiments, Kinematic Asset Management System 100 is configured to accept one or more of the following image file formats: the Join Photographic Experts Group (JPEG) format, the JPEG 2000 format, the Exchangeable Image File (Exif) format, the tagged Image File Format (TIFF), the Portable Network Graphics (PNG) format, the Graphics Interchange Format (GIF), a bitmap file, the JPEG XR format, the InterLeaved BitMap (ILBM) format, the Adobe PhotoShop Document (PSD) format, and the Corel Paint Shop Pro (PSP) format. Furthermore, Kinematic Asset Management System 100 is also configured to accept various image vector formats such as the Scalable Vector Graphics (SVG) standard, of various implementations of 2D and 3D vector formats, as well as various implementations of compound formats and stereo formats. In various embodiments, a worker's asset identification (e.g., 120A of FIG. 1) is implemented using machine readable identification tags capable of conveying data using, for example, RFID-based identification data, magnetic swipe cards, a barcode, 26-bit Wiegand technology, smart cards, or the like.

In FIG. 1, system 100 further comprises a Kinematic Asset Management Platform 150. In accordance with various embodiments, Kinematic Asset Management Platform 150 collects, stores, and reports kinematic asset information and position data and is integrated with enterprise inventory and operations applications. Kinematic Asset Management Platform 150 also provides interfaces for other enterprise asset management, dispatch systems, workflow, supply chain, human resource, and work ordering systems.

Figure 2:
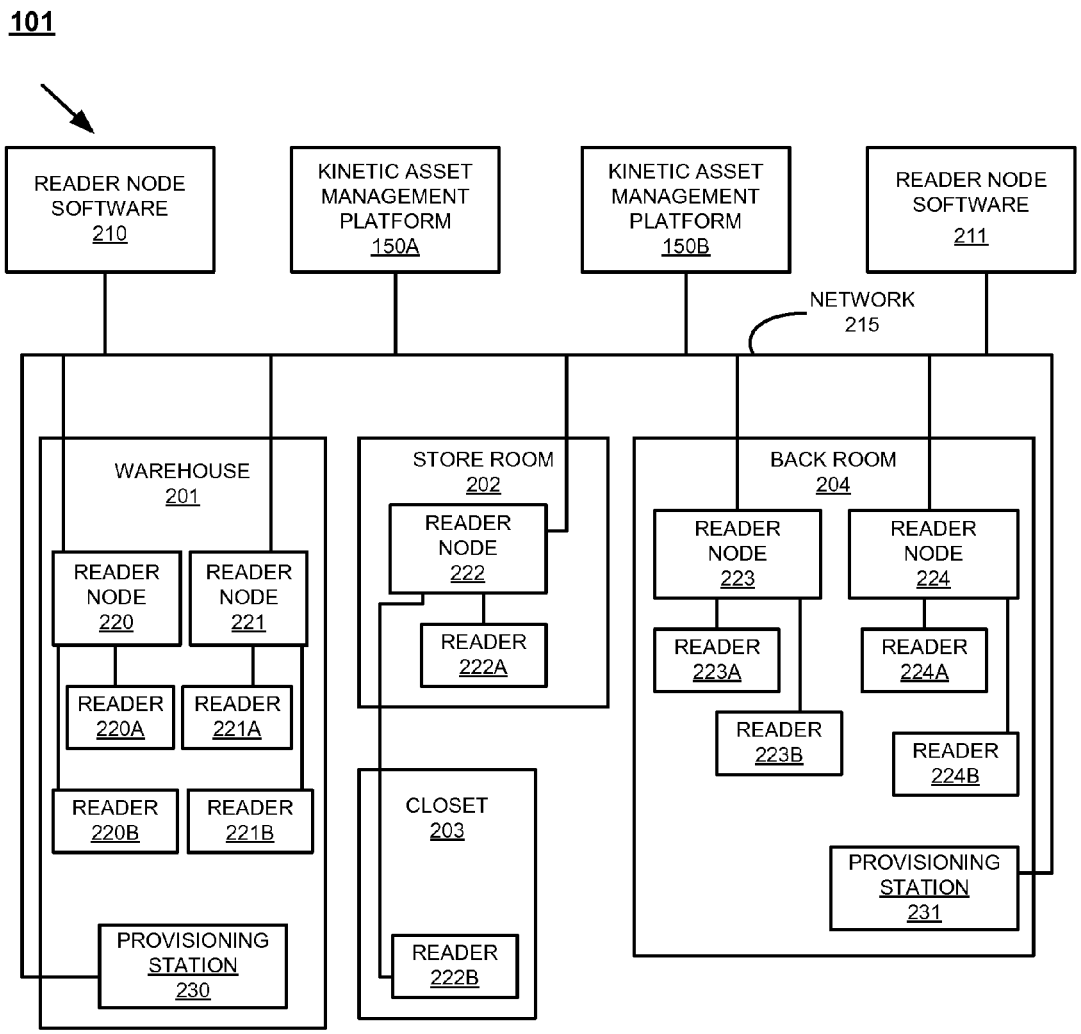
FIG. 2 shows an example fixed location implementing asset identification technology in accordance with various embodiments.

FIG. 2 shows an example fixed location 101 implementing asset identification technology in accordance with various embodiments. In FIG. 2, fixed location 101 comprises a warehouse 201, a store room 202, a closet 203, and a back room 204. It is noted that while FIG. 2 shows fixed location 101 as a building, in various embodiments fixed location 101 can also be an outdoor space including, but not limited to, a parking lot, equipments storage yard, or the like. A plurality of reader nodes (e.g., 220, 221, 222, 223, and 224) is coupled with a plurality of readers which are configured to capture asset identification data. Thus, reader node 220 is coupled with readers 220A and 220B, reader node 221 is coupled with readers 221A and 221B, reader node 222 is coupled with readers 222A and 222B, reader node 223 is coupled with readers 223A and 223B, and reader node 224 is coupled with readers 224A and 224B. In accordance with various embodiments, readers 220A, 220B, 221A, 221B, 222A, 222B, 223A, 223B, 224A and 224B are RFID readers, barcode readers, camera/video equipment, magnetic swipe card readers, 26-bit Wiegand readers, smart card readers, or other sensors which are placed within fixed location 101 to detect assets. In accordance with various embodiments, readers 220A, 220B, 221A, 221B, 222A, 222B, 223A, 223B, 224A and 224B can be located at doorways of fixed location 101 to monitor when assets move from one room to another, or are taken outside of fixed location 101. Additionally, readers 220A, 220B, 221A, 221B, 222A, 222B, 223A, 223B, 224A and 224B can be placed throughout fixed location 101 to monitor assets which may not be detected in a larger area when assets are located away from doorways.

In accordance with various embodiments, reader nodes 220, 221, 222, 223, and 224 can be autonomous reader nodes which do not require manual intervention by a user (e.g., implementing RFID technologies described above). In at least one embodiment, an autonomous reader node is implemented as a roving cart or vehicle which detects the presence of assets, records its own position (e.g., using RFID cards with position information, GNSS receivers, etc.) and reports to Kinematic Asset Management Platform 150 (e.g., via a WiFi network, cellular network, or other wireless communication technology). Reader nodes 220, 221, 222, 223, and 224 may also comprises "manned" stations which implement barcode readers, or other technologies which necessitate manual intervention by a user. It is noted that reader nodes 220, 221, 222, 223, and 224 can implement both autonomous and manual technologies in at least one embodiment. Thus, if an asset is tagged with an RFID tag and a barcode, both forms of object identification can be read at reader nodes 220, 221, 222, 223, and 224. As an example, in FIG. 2 reader node 220 is coupled with reader 220A which can be an RFID reader, implementing one or more of the RFID technologies described above, and with reader 220B which can be a barcode reader. In one or more embodiments, reader nodes 220, 221, 222, 223, and 224 are implemented using a computer system (e.g., computer system 500 of FIG. 5) which is coupled with a network 215. In one or more embodiments, reader nodes 220, 221, 222, 223, and 224, and reader devices respectively coupled therewith, can be implemented as a single device. Additionally, reader nodes 220, 221, 222, 223, and 224 can be used in provisioning assets into a Kinematic Asset Management Network in various embodiments. In at least one embodiment, a reader node is responsible for maintaining an inventory of the items contained within the containers (e.g., rooms, vehicles, etc.) that it is monitoring and communicating changes of that inventory to Kinematic Asset Management Platform 150.

A typical RFID reader node continuously scans its area to detect new tags which may appear, or to report tags which have been previously responding and are no longer responding. In one embodiment, a reader node will simply report these observations as objects which have entered or left the are monitored by the reader node. For manually-entered associations, a user can log into Kinematic Asset Management Platform 150 and manually declare asset associations and disassociations. For example, a user can login and specify that item A has been checked out of warehouse 201 and is now in a vehicle (e.g., 300 of FIG. 3B). In the case of barcode reader nodes, some user intervention may be necessary to specify that the asset identified by the barcode reader is entering or leaving a container.

In the embodiment of FIG. 2, reader nodes 220, 221, 222, 223, and 224 are coupled with reader node software. For example, reader nodes 220, 221, and 222 are coupled with reader node software 210 while reader nodes 223 and 224 are coupled with reader node software 211. Reader node software 210 and 211 act as hosts for appropriate sensors (RFID, barcode reader, etc.) and allow a user to make these associations. This software allows the user to select existing assets and identifiers already in the system as well as create new assets and/or identifiers during the provisioning process. In various embodiments, more than one identifier may be attached to an asset. This may be done to decrease the likelihood that an asset goes "unnoticed" by the sensors as may occur if an identifier is occluded or otherwise put into a situation that makes it unreadable. The allowance for business assets to have more than one machine-readable identifier must exist throughout the entire system. In at least one embodiment, it may be desirable to monitor which software instance of a reader node monitored separate sections of a facility. Thus, each of reader nodes 220, 221, 222, 223, and 224 can be provisioned with a unique login username which can be used to identify the reader node software to the system.

As shown in FIG. 2, a single instance of reader node software (e.g., reader node software 210 of FIG. 2) can monitor multiple rooms/containers/areas as well as host multiple reader nodes, each with multiple readers in different areas (e.g., reader node software 211 of FIG. 2). In accordance with various embodiments, each instance of reader node software provides an installation mechanism that facilitates making associations and dissociation to system 100 for each of its monitored assets, regardless of the physical installation of monitored areas, reader nodes, and readers. Reader node software 210 and 211 can be configured to provide a drop-down list of all rooms at fixed location 101 from which selections can be made as well as an interface for creating new rooms if necessary. In operation, each of the rooms of fixed location 101 is considered a container of other assets. Thus, each room of fixed location 101 can be identified with a unique identifier With reference again to FIG. 2, fixed location 101 further comprises provisioning stations 230 and 231. In accordance with various embodiments, a provisioning station is simply a tool (e.g., a computer system plus software) that facilitates the creation of Objects and the associations of those Objects within the database of Kinematic Asset Management Platform 150. In its simplest implementation, a provisioning station adds assets into the system if they are not already recorded, adds an identification label into the system if it is not already recorded, and associates the label with the asset. Typically, the associations of the Objects performed at a provisioning station are no different than the associations made by RFID readers (for example) during the normal business day except that associations performed at a provisioning station are done manually and they are expected to last a very long time, presumable the life of the provisioned Objects. In other words and for example, associating an RFID tag with a tool is logically the same as associating the tool with a van except that the tag/tool association is semi-permanent and the tool/van association is dynamic can possibly change during the normal work day.

In accordance with various embodiments, provisioning (or "commissioning") of assets involves the association of an identifier (e.g., 105A of FIG. 1) with an asset (e.g., 105 of FIG. 1). This typically comprises two aspects: physically attaching an identifier to the asset and second, telling the system that this new identifier is associated with that asset. These steps can occur at the same time, or can be vastly separated in time and distance. The latter instance would be the case if an asset came from the manufacturer with a suitable identifier already attached. To simplify the process for the user, a provisioning station (e.g., 231 and/or 231 of FIG. 2) restricts its Object associations to associating Objects of the Role "Identification" with Objects that "make sense" (e.g., business assets, etc.). If the provisioning station is an RFID Tag provisioning station, then it would create Objects of Type "RFID Tag" of particular Manufacturers and Models, creates "asset" (e.g., Objects of any reasonable existing Type or newly created Type such as a tool) and associates the two Objects together using the Association type "Infrastructure".

It is noted that provisioning stations 231 and 231 may provide more information than just that created during provisioning. For fixed provisioning stations (vs. portable), the provisioning station software itself will be an Object in the system in a manner similar to reader node software 210 and 211 and are identified by a username/password unique to that provisioning station. Similar to an in-building node that monitors room(s) in that building (the rooms are Objects too) during normal business operations, provisioning stations 231 and 231 will be made known to the system as Objects and will also be associated with the room/area that they are in. Then, when an item is provisioned at that particular provisioning station, it is not only provisioned into the system but is also automatically located "in the provisioning area" where the provisioning station is located.

In accordance with various embodiments, any tool that can access the web services provided by Kinematic Asset Management Platform 150 can be a provisioning station. In one embodiment, the provisioning station could accept all information manually (typed). In this case, no external peripherals, such as an RFID reader, would be required. Furthermore, provisioning stations do not have to be at fixed locations within fixed location 101. Portable provisioning tools (e.g., having integrated RFID and/or barcode readers) could be deployed to provision assets "in place", thus eliminating the need to physically route all assets through a provisioning station at a fixed location.

While the association of identifiers to their corresponding assets is typically a one-by-one operation, in at least one embodiment provisioning stations 231 and 231, or a web interface, are configured to batch upload asset information. The batch upload simply pre-loads assets (e.g., 105 and 115 of FIG. 1) into the system for later provision/association by a provisioning station. For example, if assets arrive from vendors/manufacturers already RFID-tagged, a batch upload of the assets and their identification associations can be made available to provisioning stations 231 and 231.

In the example of FIG. 2, reader nodes 220, 221, 222, 223, and 224 are coupled with either a local Kinematic Asset Management Platform 150A, or a cloud-network implemented Kinematic Asset Management Platform 150B via network 215.

Object Categorization, Characterization, and Association

In accordance with various embodiments, each asset in an enterprise is regarded as an object. This is a naming convention and is done to improve clarity in the system. Everything, everyone, and everywhere (e.g., tools, bar code labels, RFID tags, people, rooms in buildings, cities, vehicles, login accounts, cable boxes, etc.) in the database of kinematic asset management platform 150 is an object. The categorization and characterization of objects typically comprises three aspects: the types of objects, the role that objects of that type perform in the system, and the individual objects themselves. In general terms, an object's type specifies what that object is, while the object's role specifies its purpose in the enterprise.

In an example of database fields used in various embodiments to describe an object, Table 1 below shows example database fields and a description of those fields in accordance with various embodiments.

TABLE 1

| Field | Description |
| --- | --- |
| Account ID | Account to which the object belongs. This ID refers to an item in an Accounts table. |
| Object Type ID | Refers to an Object Type database field. |
| Object Name | A name of the object (e.g., hammer, drill bit, etc.) |
| Object Serial Number | A unique identifier across all Objects in the database of that particular object. |
| External Reference | A free-form field used to identify this Object to systems outside of the Kinematic Asset Management Platform. For example, if the object is listed as asset 1234 in the customer's SAP system, this field would contain 1234. |
| Description | Free form description of the object. |

In accordance with various embodiments, the Object Name and Description fields may not be entered if the object is not unique to this particular object. For example, if this Object is one of 100 Stanley Model 400 Hammer Drills, the serial number of this object alone may be entered. The Fields "Stanley," "Model 400," and "Hammer Drill" would be contained in the Object Type referenced by the Object Type field.

As discussed above, the field "Object Type" specifies what an Object is. Object types are also contained in a database table. In various embodiments, names of Objects include, but are not limited to, "Motor Vehicles," "Cable Boxes," "RFID tags," "Bar Code Labels," "Persons," and "Rooms" and are uniquely defined by their manufacturer and model when appropriate. In one embodiment, the system has an initial list of Object Types that belong to an account and additional object types can be added to the system and "owned" by individual accounts. Thus, each account has access to Object Types that belong to the root account and to those created under their own account.

In an example of database fields used in various embodiments to describe an Object Type, Table 1 below shows example database fields and a description of those fields in accordance with various embodiments.

TABLE 2

| Field | Description |
| --- | --- |
| Account ID | Accounts to which this object belongs. This ID refers to an item in the Accounts table. |
| Name | "Hammer Drill" (see other examples above) |
| Manufacturer | "Stanley" |
| Model | "400T" |
| Description | A free form description of the object. |
| Role | An object's role is its purpose to the Enterprise. |

In various embodiments, an Object type cannot share the same manufacturer and model number in a given account. The specific data content of an Object Type distinguishes it from other types of objects. New object types may be created by users and subsequent queries and reports can extract information specific to those object types. Additionally, object types can be used for information extraction to generate reports or alerts. For an example, a query can be generated to "List all the "Cable Boxes" in a given van." In another example, a query can be generated to "List the "Cable Boxes" of this manufacturer and this model in a given van." In another example, a query can be generated "How many Ronco Model 1000s are in a given room?"

In various embodiments, each type of Object has a role in the system. Roles include, but are not limited to "Identification", "Business Asset", "Container", "and "Collection". Special roles can be reserved for internal use such as "System Access" for an Object with the object type of "Login". As discussed above, an Object's role defines its purpose in an enterprise. An Object's purpose could be to identify other objects, as a Container for other objects, as a Business Asset, etc. In one embodiment, Object roles will be an enumerated list of roles rather than contained in a separate database table. In the example below, while presented in a table for clarity, it is again noted that the Object roles are described in an enumerated list.

TABLE 3

| Role | Description | Examples |
| --- | --- | --- |
| Identification | An object used as identification for another object in the system | RFID tag, bar code, etc. |
| Container | An object whose role is to contain other objects. | Storeroom, van. |
| Business Asset | Typically an end user's tools, equipment, and parts. | Cable set-top box, test-set, oscilloscope. |
| Collection | A virtual object that is a group of other objects (e.g., a "kit"). | |
| System Access | | |
| Reader/Sensor | | |
| Employee | | |

To better differentiate between the roles of Container and Collection, in one embodiment a container is a physical asset such as a room or vehicle which contains other assets. In one embodiment, when presenting the contents of a container, if another Container is found within the first Container (e.g., a storeroom within a warehouse), the drill down of objects in the container does not stop at the storeroom, but continues into the contents of the storeroom as well. In contrast, in one embodiment a Collection is considered a virtual asset that is simply a set of other assets which are treated as a single asset. When presenting the contents of a Container, if a Collection is found (e.g., an installation "kit" in a storeroom), the drill down stops and simply present the existence of the "kit" and not the individual assets within the kit.

In various embodiments, the relationship between Objects in the system is called an Association. Object Association is a mechanism which connects all Objects in an Enterprise's system. This commonness allows a very simple database design which uses a list of objects and a second list describing how those objects are associated, regardless of how, or why, that association came to be. This allows a single hierarchy regarding all objects in the system. This hierarchy is uniform all the way from a tool and the tag on the tool, to the RFID reader installed in a vehicle reading the tag, to the vehicle itself being read by a reader installed in a warehouse. Object associations can typically be one of 2 types: "Infrastructure" or "Operation". Infrastructure associations typically include "provisioning" where a business asset (e.g., asset 105 of FIG. 1) is labeled with an RFID label (e.g., Asset ID 105A of FIG. 1). In one embodiment, the relationship between the RFID label and the business asset is an "Infrastructure Association". In this example, the RFID label and the business asset are separate and distinct Objects in the database of Kinematic Asset Management Platform 150. The fact that the RFID label has been adhered to the business asset is added to the Associations table of Kinematic Asset Management Platform 150 as part of the provisioning process. This association does not affect either the RFID label object record or the business asset object record in the Objects table. In various embodiments, all associations that are part of the infrastructure of the system are identified in the Associations table with an Association Type of "Infrastructure". These include, but are not limited to, n RFID label or tag attached to a business asset, an RFID reader installed in a vehicle, RFID readers installed in buildings, etc. Typically, these Infrastructure Associations tend to be semi-permanent and change only during a change of infrastructure such as replacing broken or lost RFID tags or equipment or possibly moving tags or readers to different locations/assets. Other than the semi-permanence of these associations, they are identical to the frequently changing associations that occur during the normal business day, associations that are determined by reading RFID tags and bar codes instead of attaching labels and tags to business assets.

In contrast, Operation Associations can change during the normal course of a company's business. These are the associations that occur when a sensor, such as an RFID reader, detects that an object is nearby. This detection creates a direct association in the system between the reader and the identification label and subsequently a logical association between the container in which the Reader is installed and the business asset to which the label is attached.

These associations are dynamic, but other than their Type of Association (in this case, "Operation"), they are identical in the database to the infrastructure associations created during asset provisioning and system equipment installations. In various embodiments, associations that occur during the operation of a customer's business are identified in the Associations table with an Association Type of "Operation". These include, but are not limited to, RFID detection of assets in containers such as storerooms and vehicles, manual entry of asset location (e.g. manually declaring "The oscilloscope is in van 00123"), etc.

Ownership of Objects

In accordance with various embodiments, some Object Associations are between an asset and the container within which that asset is located. Sometimes this association indicates "ownership" such as when a tool is within a van. In other cases it simply indicates a physical state (e.g., the result of multi-layer containment), such as when a tool is within a van (a container) and the van is within a warehouse (another container). As an example, if a hammer is within a van and the van is within a warehouse then the hammer is physically and literally in the warehouse. However, the hammer is not 'owned by' the warehouse. It's "owned" by the van. This comes into play when, for example, someone asks how many hammers are currently in a warehouse. The response should not include the hammers that are within a van that just happens to be parked within, or proximate to, the warehouse at that time. In other words, "within" is a physical state while "owned by" is an operations/business state. For example, if a vehicle (e.g., mobile location 110) is parked near fixed location 101, and the readers of both the vehicle and fixed asset detect the asset identification 105A of asset 105, the reader nodes of both the vehicle and fixed location 101 will report the presence of asset 105 to Kinematic Asset Management Platform 150. Kinematic Asset Management Platform 150 will then apply rules to prevent reporting the presence of asset 105 in two different locations at the same time. For example, Kinematic Asset Management Platform 150 can implement a rule in which all possibilities are presented. As a result, Kinematic Asset Management Platform 150 would present to a user that asset 105 is in fixed location 101 as well as in mobile location 110. In another embodiment, Kinematic Asset Management Platform 150 can implement a rule which states that assets are owned by their respective containers until "released" (e.g., assigned ownership to another container). In this case, Kinematic Asset Management Platform 150 would present to a user that, for example, asset 105 is in fixed location 101. In another embodiment, Kinematic Asset Management Platform 150 can implement a rule which states that the asset is owned by any new container that claims it. In this example, Kinematic Asset Management Platform 150 would present to a user that asset 105 is within mobile location 110. In another example, Kinematic Asset Management Platform 150 can implement a rule which states that in cases where there is some ambiguity as to where the asset is located, the location of that asset will not be definitely reported. In this example, Kinematic Asset Management Platform 150 would report to a user that Kinematic Asset Management system 100 cannot report with certainty where asset 105 is located.

In accordance with various embodiments, "ownership vs. containment" may be resolved by Kinematic Asset Management Platform 150 and/or various reader nodes (e.g., 220, 22, 222, 223, and 224 of FIG. 2, or 315 of FIG. 3B) using the Roles of the Objects and whether the associations of those Objects are Infrastructure Associations or Operation Associations. For example, the contents of warehouses are expected to be in areas of the warehouse such as storerooms. However, normally it would not expected that the content of the warehouses to be in vehicles that happen to be pulled into the warehouse. This requires a different presentation for separate cases in which a hammer is within a storeroom within the warehouse and a hammer within a vehicle within the warehouse.

In accordance with various embodiments, to properly respond to a query for the content of a container (e.g. warehouse, van, city, etc.), the contents of all containers that are "Infrastructure associated" with the queried container are to be included. This requires recursion in case there is more than one level of sub-container. So, the contents of monitored storerooms that are "infrastructure-ally associated" with a warehouse are included in the content of the warehouse but the content of the van parked within the warehouse that is "operationally associated", rather than "infrastructure-ally associated", with the warehouse is not.

Figure 3A:
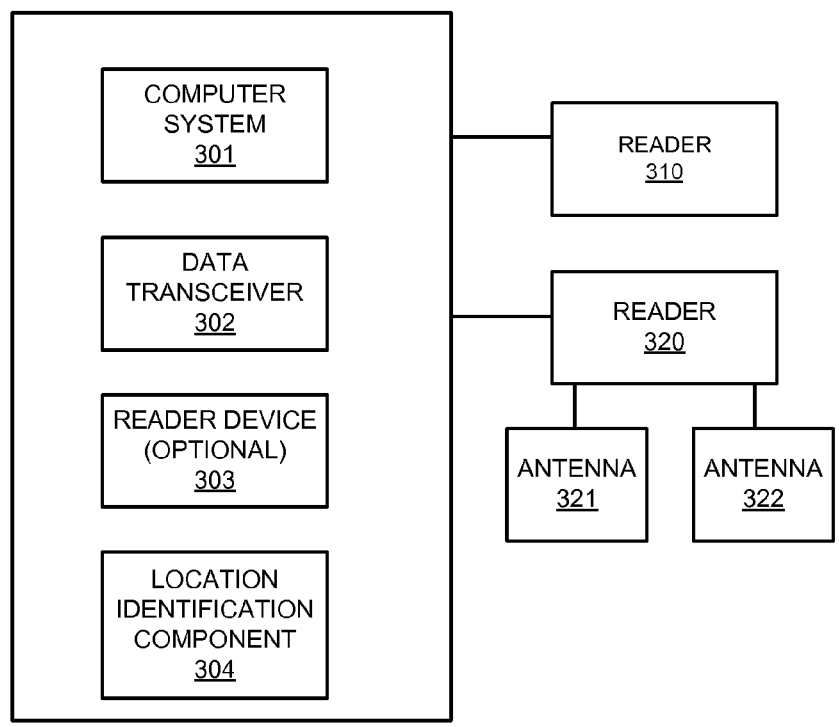
FIG. 3A shows components of an example reader node in accordance with various embodiments.

FIG. 3A shows components of an example reader node 300 in accordance with various embodiments. In the embodiment of FIG. 3A, reader node 300 comprises a computer system 301 (e.g., computer system 500 of FIG. 5), and a data transceiver 302. In accordance with various embodiments, data transceiver 302 comprises a wired or wireless communication transceiver. For example, data transceiver 302 may utilize communication standards and protocols including, but not limited to, WiFi network protocols (e.g., compliant with the Institute of Electrical and Electronics Engineers (IEEE) 802.11 standards), the Bluetooth wireless standard (e.g., compliant with the IEEE 802.15 standard), the IEEE 802.15.1 standard for personal area networks, the ZigBee specification for wireless personal area networks (e.g., compliant with the IEEE 802.15.4 standard), as well as other devices compliant with other implementations of the IEEE 802.15 standards for wireless personal area networks. In FIG. 3A, computer system 301 is communicatively coupled with at least one reader (e.g., 310 and 320) which in turn may be coupled with respective sensing devices such as antennas 321 and 322. As described above, a reader can comprise any sensing technology such as RFID readers, cameras, swipe card readers, and the like. In one embodiment, a reader node comprises at least one integrated reader device (e.g., 303 of FIG. 3A). In other embodiments, reader nodes are communicatively coupled with reader devices which are located separately from the reader node itself.

In various embodiments, reader node 300 further comprises a location identification device 304. In one embodiment, the location of readers 310 and 320, as well as reader node 300, are recorded when they are disposed in a fixed location. This can comprise the GPS coordinates of readers 310 and 320, as well as of reader node 300. Alternatively, other position references such as the address of a building where reader node 300 and/or readers 310 and 320 are located, or a local reference coordinate system can be used to convey the location at which reader node 300 and readers 310 and 320 are located. In the instance in which reader node 300 is associated with a moving asset such as a vehicle, location identification device 304 can comprise a position determination component such as a GNSS receiver. Alternatively, location identification device 304 can comprise a passive device such as a RFID tag, or the like, which is detected by other readers located at known locations.

Figure 3B:
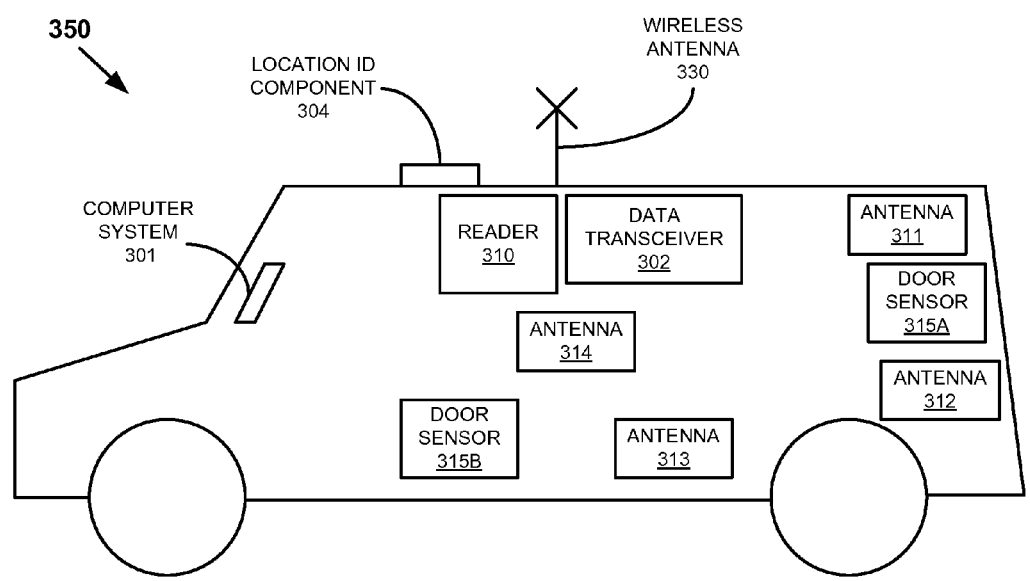
FIG. 3B shows an example vehicle implementing asset identification technology in accordance with various embodiments.

FIG. 3B shows an example vehicle 350 implementing an example reader node (e.g., 300 of FIG. 3A) in accordance with various embodiments. It is noted that vehicle 350 of FIG. 3B is intended as one example of a mobile location 110 described above with reference to FIG. 1. Furthermore, while components shown in FIG. 3B are described as separate entities, in one or more embodiments the components described in FIG. 3B can be combined in various configurations. In the example of FIG. 3B, vehicle 350 is equipped with a location identification component 304. In one embodiment, location identification component 304 is for receiving broadcast radio signals from orbiting satellites and deriving a position of vehicle 350. For example, in one embodiment, location identification component 304 comprises an integrated GNSS antenna/receiver unit. Vehicle 350 is further equipped with a plurality of antennae (e.g., 311, 312, 313, and 314) which are coupled with a reader 310 and placed to provide a complete coverage of the interior of vehicle 350. It is noted that antennae 311, 312, 313, and 314 can implement any of the RFID technologies discussed above, as well as barcode readers, manual data input devices, image recorders such as cameras or video recorders, magnetic swipe card readers, etc. In one or more embodiments, various combinations of the above listed technologies can be implemented in a single vehicle. Furthermore, more or less antennae than shown in FIG. 3B can be utilized in accordance with various embodiments. Vehicle 350 is also equipped with door sensors 315A and 315B. In a vehicle, continuous operation of reader 310 and/or antennae 311, 312, 313, and 314 can lead to excessive battery drain. Therefore, in at least one embodiment, rather than continuously scanning for RFID tags, reader 310 and/or antennae 311, 312, 313, and 314 will be actuated when the opening/closing of doors of vehicle 350 is detected by door sensors 315A and 315B. This can include when the vehicle power is shut off. In this instance, reader 310 can be configured to initiate collecting data from antennae 311, 312, 313, and 314 for a period (e.g., 2 minutes) after the opening or closing of a door of vehicle 350 is detected. It is noted that reader 310 can also initiate periodic scans for RFID tags at some greater interval than might be implemented at fixed location 101 such as once every half hour, hourly, every two hours, etc. Furthermore, in at least one embodiment, when the vehicle power is turned on, antennae 311, 312, 313, and 314 can be operated in a continuous, or shortened polling interval mode. One advantage of using door sensors 315A and 315B is that reader 310 can initiate a scan for assets within vehicle 350 every time the operator of vehicle 350 closes the doors in preparation to leave a site. Thus, an inventory of assets within vehicle 350 can be automatically performed before vehicle 350 leaves its current location. This can ensure that no equipment or other assets have been left behind, or that vehicle 350 is leaving a warehouse with its correct inventory of assets. Another advantage of using door sensors 315A and 315B is that when a door is opened, an asset is more likely being moved into or out of a vehicle and can be more readily detected by antennae 311, 312, 313, and 314 than if the asset is stored, for example, on a shelf within vehicle 350 where one or more of its asset IDs (e.g., 105A of FIG. 1) may be placed within vehicle 350 in such a manner that its asset ID is obscured.

In FIG. 3B, vehicle 350 is also equipped with a data transceiver 302 coupled with a wireless antenna 330. In accordance with various embodiments, data transceiver 302 may operate on any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard. In one embodiment, a plurality of the above described communication standards may be implemented using one or more data transceiver(s) 302 to provide redundant communication capabilities.

Periodically, reader 310 generates a command to antennae 311, 312, 313, and 314 to detect assets within vehicle 350. When assets are detected within vehicle 350, this information is time/date stamped and this data is stored by reader 310. In various embodiments, reader 310 can detect the direction of movement of an asset into or out of vehicle 350 based upon successive readings of an asset tag using antennae 311, 312, 313, and 314. Simultaneously, a position of vehicle 350 is derived using location identification component 304. In accordance with one embodiment, computer system 301 maintains a record of assets it detects within vehicle 350 and reports changes of that inventory to Kinematic Asset Management Platform 150 along with position data, time stamps, as well as messages and alerts from other reporting sources. Additionally, computer system 301 can generate an asset report (e.g., periodically, or in response to a query generated by Kinematic Asset Management Platform 150) which is wirelessly conveyed to Kinematic Asset Management Platform 150. This facilitates maintaining an up to date record of all assets, including kinematic assets, for an enterprise. In addition, in at least one embodiment computer system 301 is configured to monitor assets within vehicle 350 and to generate alerts if, for example, vehicle 350 leaves a site without the proper assets being detected by antennae 311, 312, 313, and 314. Thus, if vehicle 350 travels a pre-determined distance from a site, and if assets assigned to or owned by vehicle 350 are detected by antennae 311, 312, 313, and 314, reader 310 will generate an alert on computer system 301 (e.g., using a display device 518 of FIG. 5) to notify the driver. The driver can then return to the last site visited or otherwise resolve why the missing assets have not been detected by antennae 311, 312, 313, and 314. It is noted that, while not shown in FIG. 3B, computer system 301 can be configured with instances of software similar to reader node software 210 and 211 of FIG. 2. Furthermore, computer system 301 can also act as a provisioning station in various embodiments.

Kinematic Asset Management Platform

Figure 4:
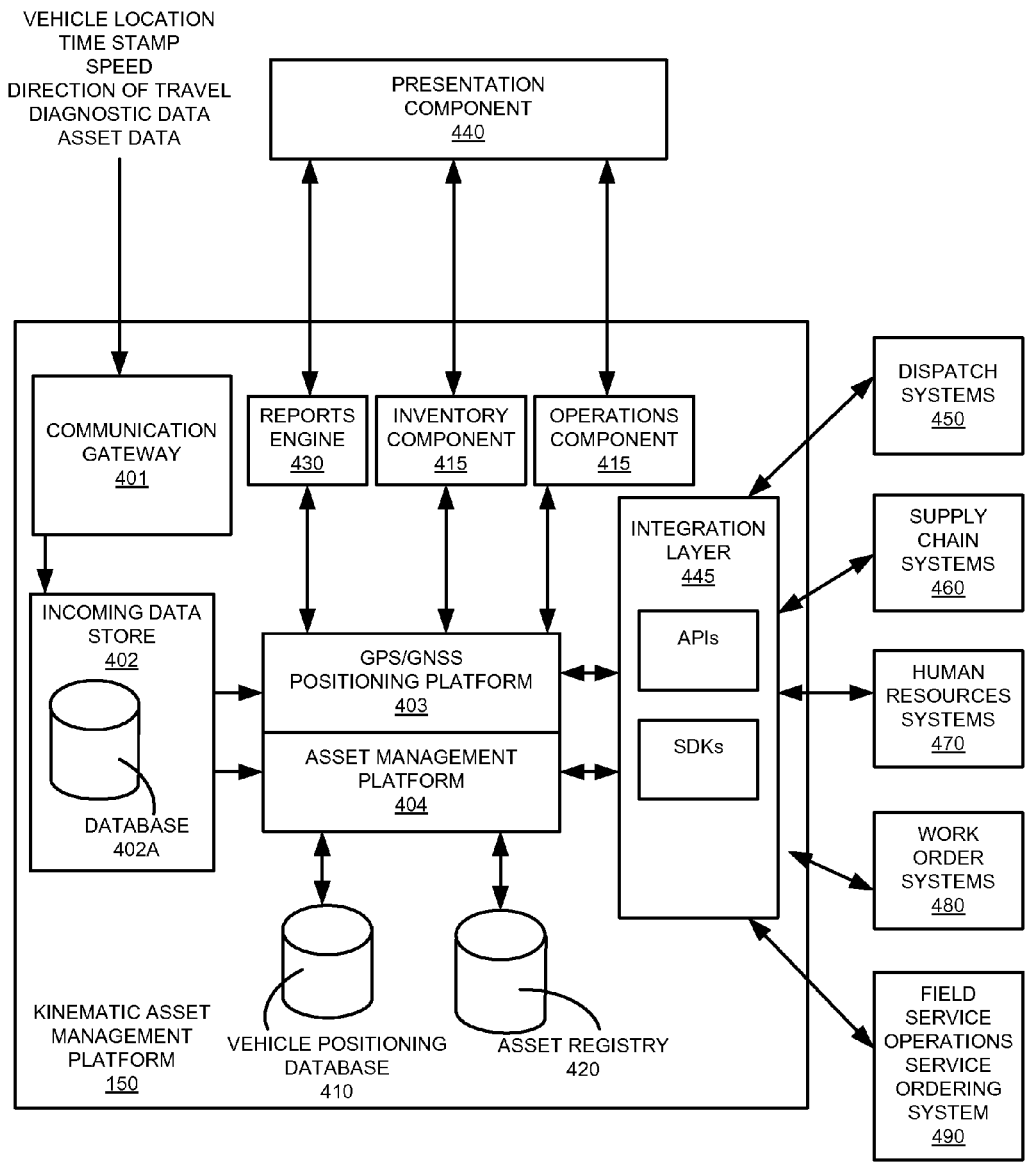
FIG. 4 is a block diagram of an example Kinematic asset management platform in accordance with various embodiments.

FIG. 4 is a block diagram of an example Kinematic Asset Management Platform 150 in accordance with various embodiments. In FIG. 4, a communication gateway 401 receives vehicle data (e.g., from vehicle 350 of FIG. 3B) including, but not limited to, the position or location of the vehicle, a time stamp, the speed and direction of travel, vehicle diagnostic data, and asset data including, but not limited to, identification of assets using RFID tag data, barcode data, ID badge numbers, time of last capture of asset inventory, etc. In FIG. 4, this data is received into an incoming data store 402 which can comprise a database 402A that holds the data described above. In FIG. 4, incoming data store 402 is in turn coupled with a GPS/GNSS positioning platform 403 and an asset management platform 404.

In FIG. 4, asset management platform 404 is coupled with a vehicle positioning database 410 and an asset registry 420. In one embodiment, asset registry 420 is a cloud based implementation which receives time stamped asset data which is also correlated with GPS/GNSS positioning data. In at least one embodiment, asset registry 420 maintains an asset location history which is stored, for example, for one year. In accordance with various embodiments, asset registry 420 comprises hardware and software logic that implements a relational database to provide complete inter-relationships between all items in asset registry 420. In one or more embodiments, the predominant inter-relationships are based on the dynamic location of, and the changing containers for, most of the assets of an enterprise. In other words, the kinematics of these assets. One function of asset registry 420 is to define assets in such a way that their attributes (e.g., static, dynamic, and relational) are useful to the applications other enterprise applications which access Kinematic Asset Management Platform 150. In other words, Kinematic Asset Management Platform 150 can be integrated into an enterprise's existing asset management system to enhance their functionality by monitoring kinematic assets.

In FIG. 4, GPS/GNSS positioning platform 403 and asset management platform 404 are coupled with a reports engine 430. In accordance with various embodiments, reports engine 430 generates reports (e.g., standardized reports, or user definable reports) of inventories, asset locations, operational status, or any other data element stored by Kinematic Asset Management Platform 150 on a periodic schedule, or on demand from a user. In accordance with various embodiments, reports engine 430 pulls data from asset management platform 404 and GPS/GNSS positioning platform. For example, in one embodiment asset registry 420 contains data regarding asset relationships and the time and location of asset relationship changes. However, the location of a vehicle (e.g., 300 of FIG. 3B) in which the asset is located is contained in vehicle positioning database 410. Thus, by pulling data from both sources, a more complete picture of the status and location of an asset can be derived by reports engine 430. In another embodiment, asset location changes are delivered to asset registry 420. Thus, the location of the asset vehicle (e.g., 300) is stored in asset registry 420 and an association is made between a detected asset and the vehicle location at the time the asset was located. In various embodiments, reports engine 430 can be configured to generate alerts based upon pre-determined parameters. For example, if a high value item is removed from a vehicle, reports engine 430 can be configured to generate a report conveying this event. In another example, if the inventory of a given asset falls below a pre-determined level, reports engine 430 will generate a report conveying this information. In another example, if a vehicle moves a pre-determined time and/or distance without the detection of an asset by the reporting system of that vehicle, reports engine 430 can generate a report conveying that information. In another example, when a given event does not occur at a pre-determined time, reports engine 430 will report this event. For example, if by 9:00 AM four assets with the attribute of "employee" are not associated with any asset with the attribute of "vehicle", reports engine 430 will generate a report of this information. Reports engine 430 can also generate complex alerts based upon numerous attributes. For example, if a high value item has been removed from a vehicle, and no asset with the attribute of "employee" is currently associated with that vehicle, reports engine 430 can generate a report indicating the possibility of theft of that high value item.

Furthermore, in FIG. 4 GPS/GNSS positioning platform 403 is coupled with a presentation component kinematic which is used as the presentation mechanism for some Kinematic Asset solutions. For example, presentation component 440 can be a privately hosted information management system (e.g., a centrally hosted website for an enterprise) which permits access to users internal and external to the enterprise. This can include calendar, file sharing, data exchange, reporting, and geo-spatial data exchange across the enterprise. One example of a presentation component in accordance with various embodiments is the Trimble Connected Community platform commercially available from Trimble Navigation of Sunnyvale, Calif. Thus, using presentation component 440, status of inventories, location of assets, or status of operations can be accessed from Kinematic Asset Management Platform 150. In one embodiment, presentation component 440 is capable of providing this information for mobile applications operable on handheld devices such as cell phones, PDAs, tablet computer systems, laptop computer systems, etc. For example, it is understood the some remote/mobile nodes can comprise handheld/mobile devices with their own GPS/GNSS and RFID capability which can convey the same information as a vehicular reporting system except that the handheld/mobile devices will use web services directly while vehicular reporting systems may use a mechanism such as an over-the-air protocol.

In accordance with various embodiments, interactions with Kinematic Asset Management Platform 150 will be via web services. In one embodiment, these web services will be accessed either directly from the field or user segments, or, for example, indirectly from the field segment when the field node is a vehicle containing equipment that may use a proprietary protocol over a cell phone network that is in turn translated to web service calls at a server.

In FIG. 4, Kinematic Asset Management Platform 150 further comprises an integration layer 445 comprising application programming interfaces and software development kits for interacting with existing enterprise applications including, but not limited to, dispatch systems 450, supply chain systems 460, human resource systems 470, work order systems 480, and field service operations service ordering systems 490. In accordance with various embodiments, integration layer 445 integrates and interfaces with other systems to automate much of the asset management process for an enterprise. By integrating with dispatch systems 450, Kinematic Asset Management Platform 150 can query asset registry 420 for available assets in response to a query from a dispatch engine. This facilitates dispatching vehicles with needed assets to a job site more efficiently. As discussed above, Kinematic Asset Management Platform 150 can interface with supply chain systems 460, or other inventory management systems (e.g., SAP, ERP, SCM, or the like) to receive asset data from other enterprise inventory systems and to transmit asset data to those other systems. By integrating with human resource systems 470, Kinematic Asset Management Platform 150 can receive employee data (e.g., equipment operating qualifications, or other qualifications) which facilitates assigning vehicles and other assets to the correct operator and to the job to be performed. By integrating with work order systems 480, Kinematic Asset Management Platform 150 can maintain a record of assets which have been consumed in the field and add this data to orders for those consumable assets. By integrating Kinematic Asset Management Platform 150 with field service operations service ordering systems 490, orders taken by customer service representatives can check asset availability to facilitate assigning vehicles to jobs.

In the embodiment of FIG. 4, Kinematic Asset Management Platform 150 further comprises an inventory component 415 and an operations component 425. In various embodiments, inventory component 415 comprises a cloud based implementation providing administrator functions including, but not limited to, account set up, identifying allowable users, establishing roles and associated access, identifying customer input pull down lists for data entry, establishing fixed sites and vehicles. User functions provided by inventory component 415 include, but are not limited to, accessing asset registry 420, creating flexible reports using reports engine 430, and viewing and printing standard reports using reports engine 430. Inventory component 415 can also be used to generate alerts to reports engine 430 including, but not limited to, monitoring vehicle asset inventory changes, monitoring vehicle locations, monitoring vehicle movement, monitoring fixed site inventory changes, establishing minimum inventory levels by item for sites, establishing minimum inventory levels by item for vehicles, and generating alerts when minimum inventory levels are reached.

In accordance with various embodiments, operations component 425 comprises a cloud based implementation providing administrator functions including, but not limited to, account set up, identifying allowable users, establishing roles and associated access, identifying customer input pull down lists for data entry, establishing fixed sites and vehicles, and setting a radius for dispatch system asset searches. User functions provided by operations component 425 include, but are not limited to, accessing asset registry 420, creating flexible reports using reports engine 430, viewing and printing standard reports using reports engine 430, and receiving asset alerts (e.g., tools left behind at a work site). Operations component 425 also provides monitoring functions including, but not limited to, monitoring technician usage of tools, monitoring technician usage of company infrastructure equipment and materials, monitoring usage of customer equipment and materials, monitoring technician/driver to vehicle assignments, monitoring technician/driver time spent in driver's seat, monitoring technician usage of test sets. Operations component 425 can also be used to generate alerts to reports engine 430 including, but not limited to, monitoring vehicle asset inventory changes, monitoring vehicle locations, monitoring vehicle movement, generating alerts when a vehicle moves without assets from the vehicles permanent asset list, generating real-time alert of theft of assets from a vehicle, generating real-time alerts of theft of assets from a fixed asset storage site, generating real-time alerts of asset inventory levels, generating real-time alerts of asset usage, responding to real-time query of equipment (e.g., tool locations, materials, customer equipment, etc.), and generating alerts on left-behind tools. Additionally, operations component 425 can be used to implement dispatch system functions including, but not limited to, receiving current vehicle locations, receiving current asset location by asset name, generating alerts when minimum inventory levels are reached, generating an alert when a required asset for a dispatch cannot be found, implementing real-time queries of technician/driver assigned to vehicles, and implementing real-time queries of tools in vehicles.

In operation, collects raw observation data of the proximity and identification of tags or labels and converts that data into usable business information such as the locations of vehicles, personnel, equipment, and other business assets. For example, a reader coupled with a reader node detects the proximity and identification of an ID tag. This raw observable of the ID tag is associated with the corresponding asset as well as with the container to which that asset is assigned. The location of the container can also be accessed by Kinematic Asset Management Platform 150 to determine the location of the asset by determining which container is associated with the reader and reader node which detected the asset. By accessing the location of that container, the location of the asset is also known.

Example Computer System Environment

Figure 5:
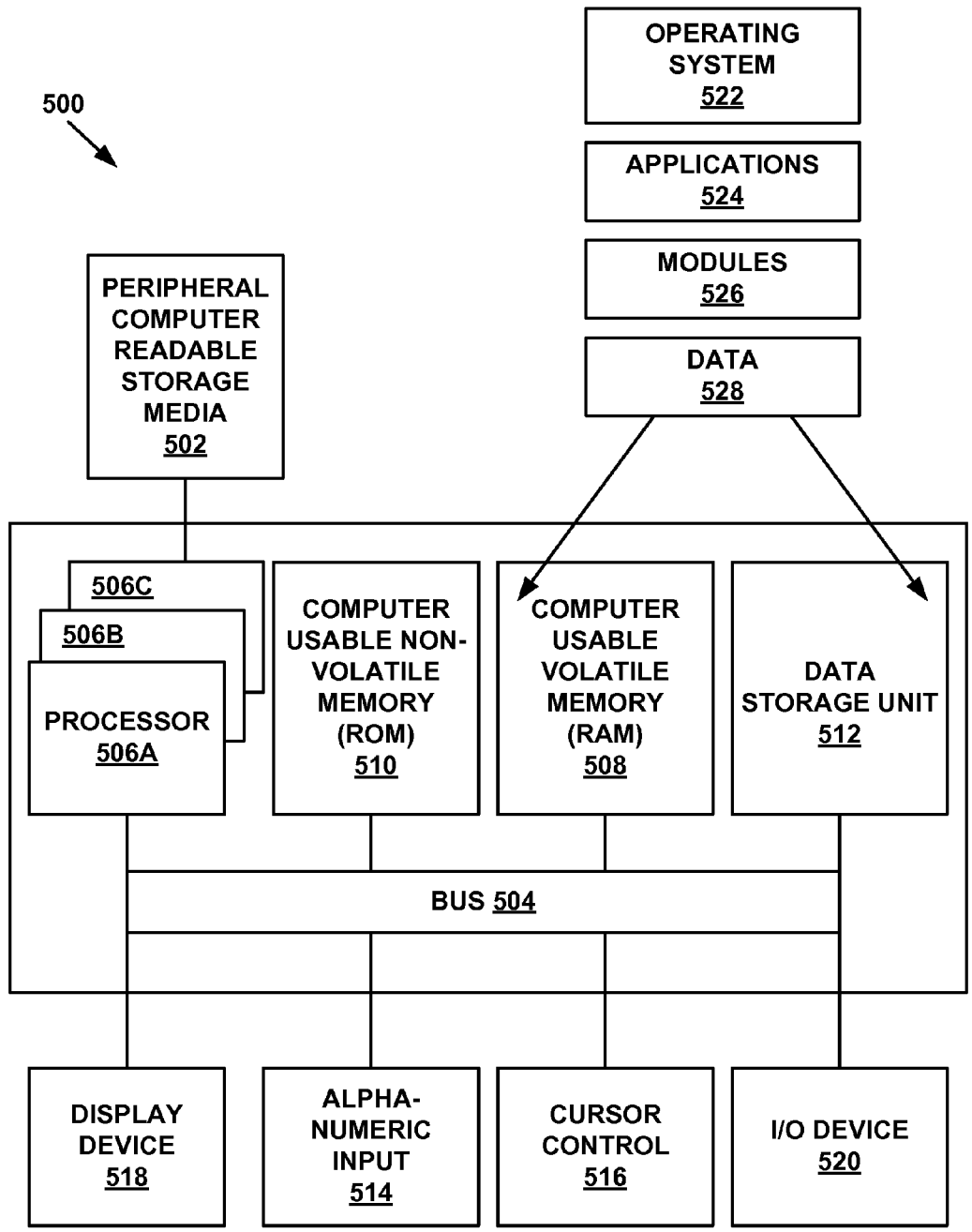
FIG. 5 is a block diagram of an example computer system used in accordance with various embodiments.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments (e.g., Kinematic Asset Management Platform 150, reader nodes 220, 221, 222, 223, 224, and 315, provisioning stations 231 and 231) which are discussed herein. It is appreciated that computer system 500 of FIG. 5 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like. Computer system 500 of FIG. 5 is well adapted to having peripheral computer-readable storage media 502 such as, for example, a floppy disk, a compact disc, digital versatile disc, universal serial bus "thumb" drive, removable memory card, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g., random access memory (RAM), coupled to bus 504 for storing information and instructions for processors 506A, 506B, and 506C. System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. In one embodiment, system 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer readable storage media.

Figure 6:
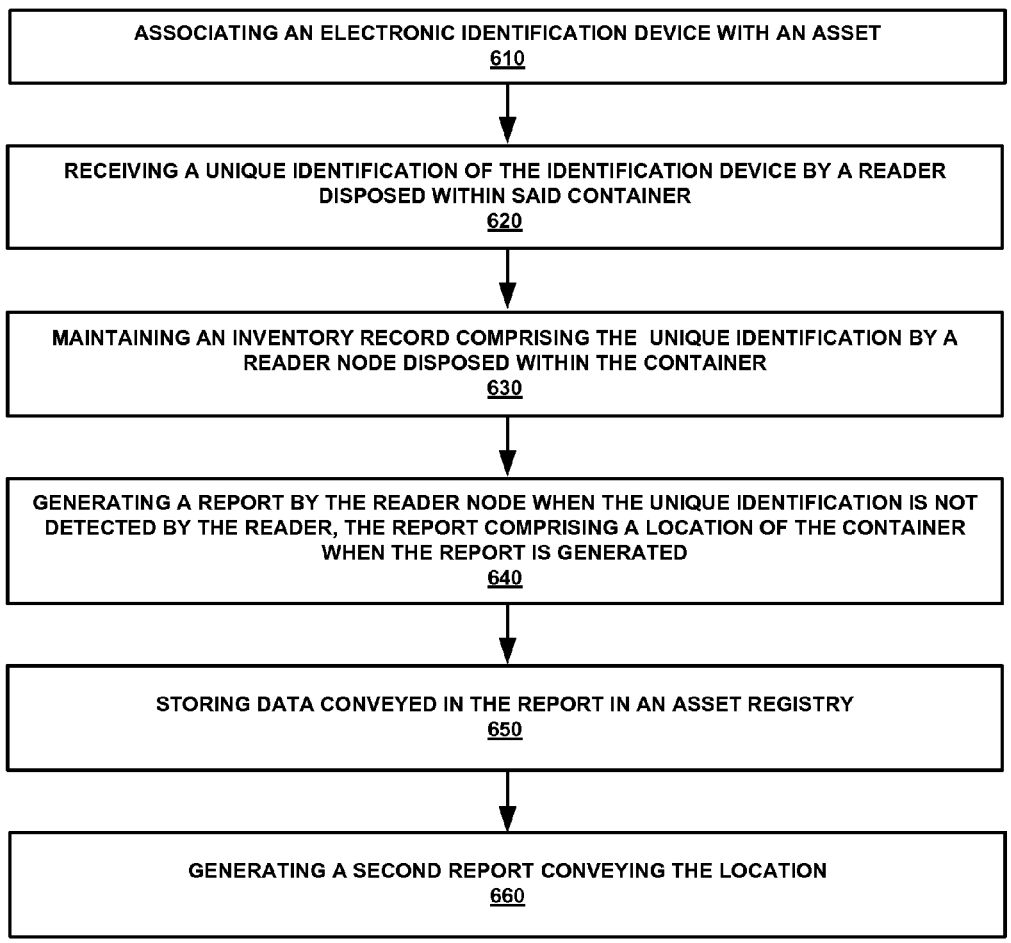
FIG. 6 is a flowchart of a method for managing kinematic assets in accordance with various embodiments.

FIG. 6 is a flowchart of a method 600 for managing kinematic assets in accordance with various embodiments. In operation 610 of FIG. 6, an electronic identification device is associated with an asset. As described above, at least one asset identification 105A is coupled with asset 105. In accordance with various embodiments, these asset identifications 105A comprise RFID tags, barcodes, magnetic swipe cards, or other machine readable identification devices that can be detected or identified by a reader device and which uniquely identify each asset of an enterprise such as system 100 of FIG. 1. During the provisioning process, asset identification 105A is associated with asset 105 and this association is stored in asset registry 420. Additionally, each asset is assigned an attribute which facilitates determining the relationship between various assets within the system. For example, as discussed above a warehouse is an asset that can contain other assets, cannot move and is at a known/static location. A vehicle is an asset that can also contain other assets, but can move and whose location is dynamic, or kinematic, and can be determined using Global Navigation Satellite System (GNSS) receivers. A tool is an asset that cannot contain other assets, but can move and whose location is not self-determined but is determined using a sensor/tag (e.g. RFID) that is read by another asset whose location is somehow known (e.g. warehouse or vehicle). In accordance with various embodiments, associations between various attributes of assets within an enterprise are made using Kinematic Asset Management Platform 150. For example, an inventory query made to Kinematic Asset Management Platform (e.g., how many test sets are currently deployed in the field) can be determined by searching how many assets with the attribute "Test Set" are currently associated with a vehicle.

In operation 620 of FIG. 6, a unique identification of the identification device is received by a reader disposed within a container. In accordance with various embodiments, buildings, vehicles, storage units, trailers, etc. are treated as containers. As described above, the containers of system 100 are equipped with reader devices which are capable of automatically, or manually, determining the unique identification of the identification device coupled with an asset. Thus, the unique identification of an asset identification device coupled with an asset is detected by readers in a container and is stored in the inventory of the reader node coupled with that reader. Again, Kinematic Asset Management Platform 150 can associate the unique identification of an asset identification device with that asset to make the logical conclusion that the asset itself has been detected at the location of the reader which detected the asset identification device.

In operation 630 of FIG. 6, an inventory record comprising the unique identification is maintained by a reader node disposed within the container. As discussed above, each reader node is responsible for maintaining an inventory of assets which have detected in the container to which that reader node is assigned. In one embodiment, the reader node maintains a list of the unique identification of each asset identification device which is coupled with an asset. Thus, a given reader node can determine whether its inventory has been changed due to the addition or removal of assets from the container which the reader node is monitoring by comparing successive lists of the unique identification of each asset identification device which is coupled with an asset. Thus, when an asset is moved, or stored, within a container of system 100, a reader(s) disposed within that container will detect the asset identification device and report the presence of that device to a reader node coupled with that reader.

In operation 640 of FIG. 6, a report is generated by the reader node when the unique identification is not detected by the reader and the report comprises a location of the container when the report is generated. In accordance with various embodiments, the readers (e.g., 305A, 305B, 305C, and 305D of FIG. 3B) in a container (e.g., vehicle 350 of FIG. 3B) periodically poll for asset identification devices (e.g., 105A) of assets located in a container. For example, RFID readers generate a wireless signal and receive responses from RFID tags which are within communication range of the RFID reader. Thus, if an asset is removed from the container, its associated RFID tag will not generate a response comprising the unique identification discussed above if the RFID reader polls for assets within the container. Similarly, if an asset is moved into a container (e.g., as vehicle 350), it will be detected when the RFID reader next polls for asset within that container. In accordance with various embodiments, the reader node (e.g., 315 of FIG. 3B) coupled with the RFID reader will compare asset lists from respective polling instances and determine whether there is a discrepancy between the contents of one inventory (e.g., unique identification numbers or alpha-numeric sequences) and the contents of another. If there is a discrepancy between respective inventories, the reader node will generate a report conveying the contents of the latest inventory. In one or more embodiments, the reader node can also convey which assets are missing in the latest inventory in comparison with a previous inventory, or may convey the contents of one or more previous inventories.

In operation 650 of FIG. 6, the data conveyed by the report is stored in an asset registry. As discussed above, asset registry 420 of Kinematic Asset Management Platform 150 stores data comprising the unique identification of each asset identification device, the attributes of assets in an enterprise, and the location of those assets. In various embodiments, the last known location of an asset can be included in a report of a missing asset. In addition, the location of the container when the report of the missing asset was generated can also be included. This can facilitate determining where the asset was removed from the container and in the possible recovery of that asset.

In operation 660 of FIG. 6, a second report is generated conveying a location of the vehicle when the report was generated. As discussed above, the location of every container in system 100 is known, or can be determined. For example, the location of fixed locations is known and stored in Kinematic Asset Management Platform 150 as an attribute. In the case of vehicles, the location of the vehicle can be determined using a GNSS receiver (e.g., 301 of FIG. 3B). In accordance with various embodiments, when reader 310 determines that a report to Kinematic Asset Management Platform 150 is to be generated, it receives a current location of vehicle 350 which is included in the report. Additionally, reader 310 can receive a current location of vehicle 350 each time an inventory or assets within vehicle 350 is performed, or in response from a query from Kinematic Asset Management Platform 150.

Moving Warehouse/Static Warehouse

Figure 7:
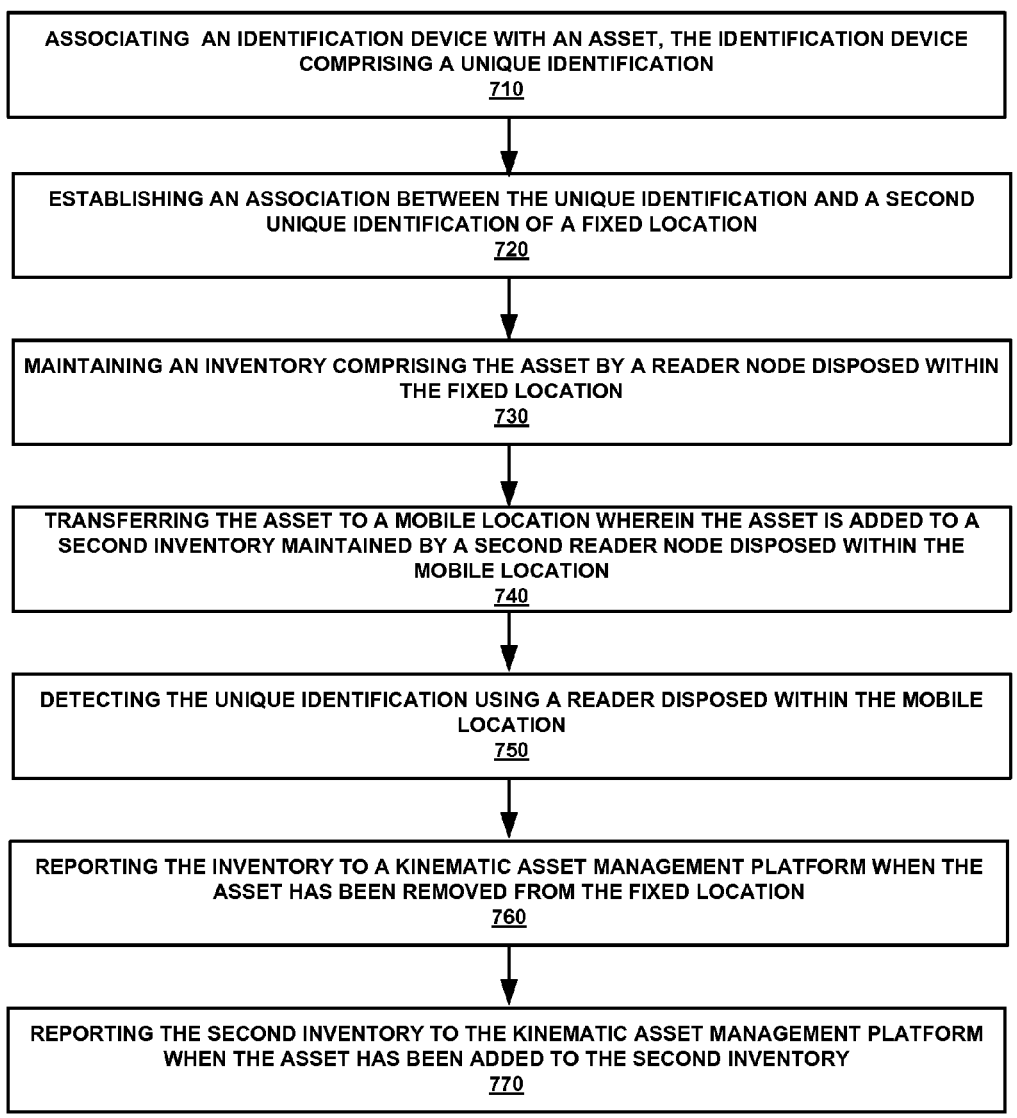
FIG. 7 is a flowchart of a method of implementing moving and static warehouses in accordance with various embodiments.
Figure 10:
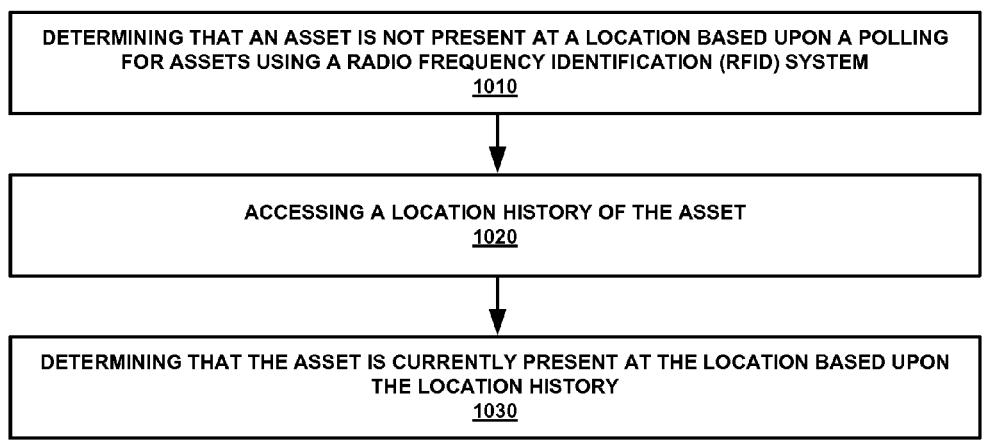
FIG. 10 is a flowchart of a method for compensating for detection shortcomings in accordance with various embodiments.

FIG. 7 is a flowchart of a method 700 of implementing moving and static warehouses in accordance with various embodiments. In operation 710, an identification device, comprising a unique identification, is associated with an asset. As discussed above, each asset (e.g., 105 or 115 of FIG. 10 is coupled with at least one respective asset identification device (e.g., 105A, or 115A of FIG. 1). The use of multiple asset identification devices allows detection of assets using multiple machine readable identification technologies, reduces the likelihood of losing an asset identification device, and increases the likelihood of detecting an asset using machine readable detection and identification technologies.

In operation 720, an association is established between the unique identification and a second unique identification of a fixed location. As discussed above, during the provisioning process, an association is made between various objects within an enterprise. Thus, an asset identification device has various attributes and can be associated with the asset with which it is coupled. In various embodiments, each container (e.g., fixed location 101 and mobile location 110) can also be associated with a unique identification (e.g., asset ID 101A and asset ID 110A of FIG. 1. These asset identifications can be assigned attributes as well. For example, asset identification 101A can be assigned the attribute "Infrastructure" while asset identification 110A can be assigned the attribute "Vehicle".

In operation 730, an inventory is maintained comprising the asset by a reader node disposed within the fixed location. As described above, reader nodes maintain an inventory of the assets which they have detected using their respective readers (e.g., RFID readers, barcode readers, etc.). Typically, the inventory is of the unique identification sequences of asset identification devices which are coupled with assets in the vicinity. In various embodiments, the reader nodes report the presence, or absence, of these unique identification sequences rather than that of the assets themselves. Then, the correlation of the unique identification sequence with its associated asset is performed by Kinematic Asset Management Platform 150.

In operation 740, in response to the asset being transferred to a mobile location the asset is added to a second inventory maintained by a second reader node disposed within the mobile location. For example, this may comprise transferring the asset from the first inventory to the second inventory when the asset itself is transferred to the mobile location.

In operation 750, detecting the unique identification is detected using a reader disposed within the mobile location. In various embodiments, when an asset is moved from a fixed location such as a warehouse into a mobile location such as a vehicle, the reader devices installed within the vehicle will automatically detect the presence of that asset. Again, the reader nodes actually record the presence of the unique identification sequence rather than the asset itself.

In operation 760, the inventory is reported to a Kinematic Asset Management Platform when the asset has been removed from the fixed location. As described above, the reader nodes maintain an inventory of the assets which are respectively assigned to them and/or which they are able to detect. Thus, when an asset is removed from a fixed location, it will no longer be detected by a reader the next time a polling is performed to detect all of the assets within the fixed location. In various embodiments, when a reader node determines that an asset has been removed from a fixed site (e.g., is no longer detected at the site), it will report this to Kinematic Asset Management Platform 150.

In operation 770, the second inventory is reported to the Kinematic Asset Management Platform when the asset has been added to the second inventory. Again, when the reader node of a mobile location such as vehicle 350 determines that a new asset has now been detected, it will add this asset to its inventory. In accordance with various embodiments, this is simply treated as a transfer of assets from one warehouse (e.g., fixed location 101 of FIG. 1) to another warehouse (e.g., mobile location 110 of FIG. 1). Thus, while the fixed asset reports that the asset has been removed, the reader node of the mobile location will report the addition of this asset to its inventory.

High-Value Equipment Loss Protection

Figure 8:
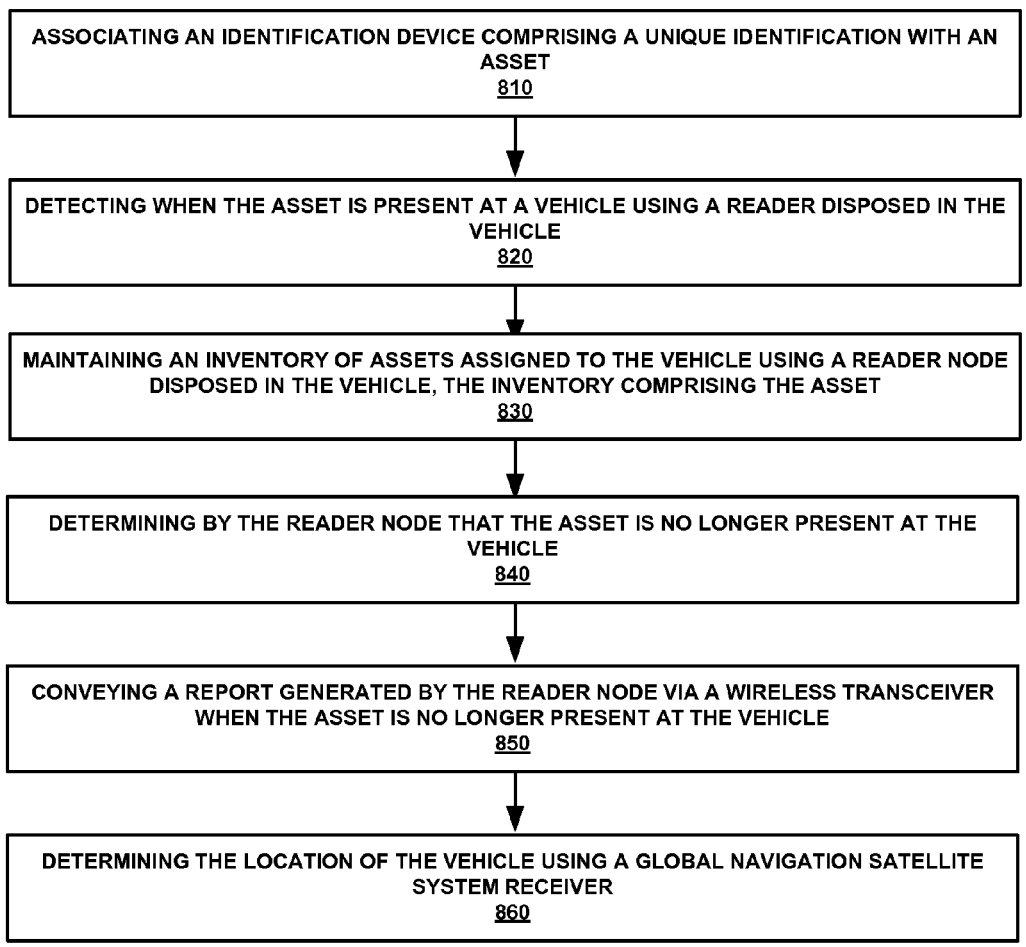
FIG. 8 is a flowchart of a method for implementing high-value equipment loss protection in accordance with various embodiments.

FIG. 8 is a flowchart of a method 800 for implementing high-value equipment loss protection in accordance with various embodiments. In operation 810, an identification device comprising a unique identification is associated with an asset. In accordance with various embodiments, at least one asset identification device (e.g., 105A, or 115A of FIG. 1) is coupled with an asset and logically associated with that asset in asset registry 420. As described above, each asset in an enterprise is associated with a unique asset identification sequence. By coupling more than one asset identification device to an asset, the likelihood of losing an asset identification device is reduced and the likelihood of detecting an asset using machine readable detection and identification technologies increases.

In operation 820, a reader disposed in a vehicle is used to detect when the asset is present at the vehicle. As discussed above, one or more readers (e.g., 305A, 305B, 305C, and 305D of FIG. 3B) are disposed within vehicle 350. In various embodiments, multiple readers are deployed within a vehicle to facilitate more complete coverage of the interior of the vehicle when polling for assets present. As a result, it is less likely that an asset identification will be obscured from a reader when trying to determine which assets are present within vehicle 350.

In operation 830, a reader node disposed in the vehicle is used to maintain an inventory of assets assigned to the vehicle, including the asset of operation 810. As discussed above, reader 310 maintains an inventory of assets assigned to vehicle 350 and/or assets which are detected using readers 305A, 305B, 305C, and 305D.

In operation 840, the reader node determines that the asset is no longer present at the vehicle. In accordance with various embodiments, a comparison of successive inventories of assets indicates when assets have been removed from, or brought into, vehicle 350. Again, this can comprise a comparison of unique identification sequences which identify the asset identification devices (e.g., 110A of FIG. 1) present in vehicle 350.

In operation 850, a report is generated by the reader node when the asset is no longer present at the vehicle and is conveyed via a wireless transceiver. In accordance with various embodiments, when successive inventories of assets indicate that assets have been removed from, or brought into, vehicle 350 reader 310 can initiate generating a report to Kinematic Asset Management Platform 150 indicating the change in inventory. In accordance with various embodiments, this is sent using data transceiver 302 of FIG. 3B.

In operation 860, the location of the vehicle is determined using a Global Navigation Satellite System (GNSS) receiver. In at least one embodiment, when reader 310 initiates a polling of assets within vehicle 315, it receives from GNSS antenna/receiver 301 an indication of the location at which vehicle 350 is located. Alternatively, reader 310 can receive the indication of the location at which vehicle 350 is located when reader 310 determines a discrepancy between successive inventories.

Work-Worker-Asset Integration

Figure 9:
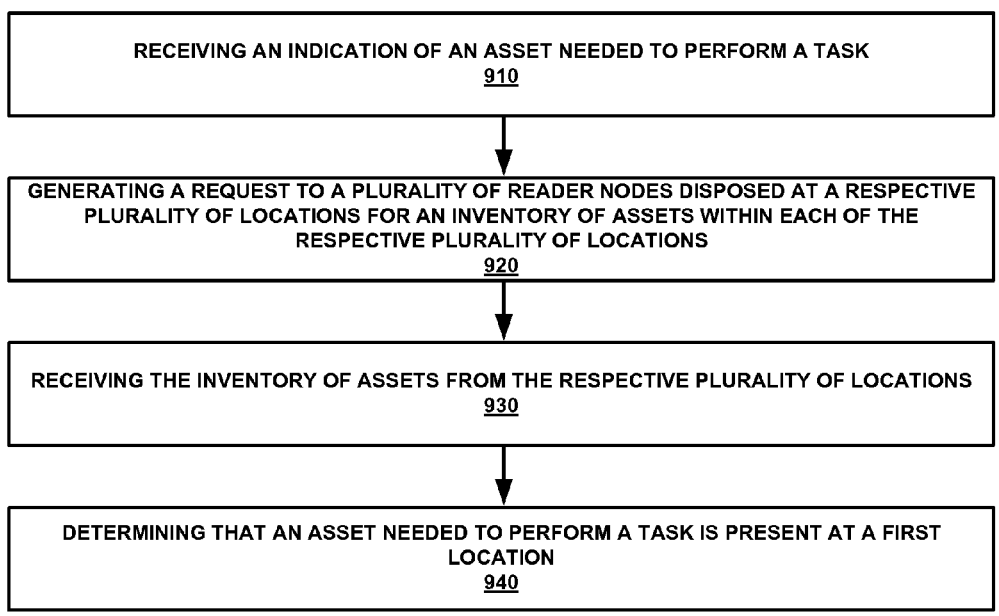
FIG. 9 is a flowchart of a method for integrating work, workers, and assets in accordance with various embodiments.

FIG. 9 is a flowchart of a method 900 for integrating work, workers, and assets in accordance with various embodiments. In operation 810, an indication of an asset needed to perform a task is received. In accordance with various embodiments, Kinematic Asset Management Platform 150 is coupled with other enterprise software systems such as, but not limited to, dispatch systems 450, supply chain systems 460, human resources systems 470, work order systems 480, and field service operations service ordering system 490. Thus, Kinematic Asset Management Platform 150 can be integrated into an enterprise in such a way as to enhance the ability of that organization to plan and execute field service operations. As an example, system 100 can be used to poll vehicles in the field to find out what equipment, consumables, and employees are deployed, and where they are located. Thus, if a service call requires a specific type of equipment, or employees with specific skills, training, or experience, Kinematic Asset Management Platform 150 can be used to locate these assets in near real time.

In operation 820, a request is generated to a plurality of reader nodes disposed at a respective plurality of locations for an inventory of assets within each of the respective plurality of locations. In accordance with various embodiments, Kinematic Asset Management Platform 150 generates a request to deployed vehicles within an enterprise as well as to fixed locations to determine where needed assets are currently located. In response, the reader nodes initiate polling of assets within their respective areas of responsibility to generate a more current picture of what assets are on hand and where they are located. Alternatively, the reader nodes can simply send the results of the last inventory stored at the reader node.

In operation 830, an inventory of assets is received from the respective plurality of locations. In response to the request for respective inventories of assets from all reader nodes of an enterprise, or from selected reader nodes in a given region, Kinematic Asset Management Platform 150 receives replies from the reader nodes which convey their current, or most recent, inventory of assets at their location.

In operation 840, it is determined that an asset needed to perform a task is present at a first location. In accordance with various embodiments, Kinematic Asset Management Platform 150 is configured to use a relational database management implementation in order to find the desired asset. As discussed above, assets are assigned attributes which facilitate finding the correct asset based upon the task to be performed.

Compensation for Detection Shortcomings

FIG. 10 is a flowchart of a method 1000 for compensating for detection shortcomings in accordance with various embodiments. In operation 1010, it is determined that an asset is not present at a location based upon a polling for assets using a Radio Frequency Identification (RFID) system. In some instances, polling for the presence of assets using RFID technology can be hindered by physical obstruction of radio waves based upon how an asset, and its associated asset identification device, are stored. For example, is an asset (e.g., 105 or 115 of FIG. 1) is stored such that its associated asset identification device (e.g., 105A or 115A of FIG. 1) is blocked from receiving radio signals from a reader (e.g., an RFID interrogator), then it may not respond to an RFID interrogation. As a result, the inventory may erroneously state that the asset is missing when in fact it is simply obscured from the radio signals from the RFID interrogator.

In operation 1020, accessing a location history of the asset. In accordance with various embodiments, Kinematic Asset Management Platform 150 maintains a location history of assets. As noted above, the reports from reader nodes can comprise time/date as well as location data for each asset detected by the reader nodes communicating with Kinematic Asset Management Platform 150. In the case of vehicles submitting inventory reports to Kinematic Asset Management Platform 150, additional information such as the speed of the vehicle when the inventory was performed can be included in reports. This information can be used to more accurately recreate a location history of the asset. For example, if an asset is detected and reported while a vehicle is moving, it is unlikely that the asset has been removed from the vehicle while it is still moving. In another example, if an asset is detected at a fixed site or vehicle, subsequently reported as missing, and then detected again at that same fixed site or vehicle, it is more likely that the asset was there the whole time and simply not detected by the RFID interrogator. Thus, by using historical analysis of the location of assets, Kinematic Asset Management Platform 150 can more accurately implement loss prevention and reporting.

In operation 1030, determining that the asset is currently present at the location based upon the location history. As described above, Kinematic Asset Management Platform 150 can access the location history of assets in order to more accurately detect the loss or theft of assets. Thus, Kinematic Asset Management Platform 150 can actually determine that an asset which may have previously been reported as lost or stolen is in fact still within the enterprise. This will reduce overstocking of assets which might have been ordered based upon false reporting of missing or stolen assets which subsequently appear back into the system.

Figure 11:
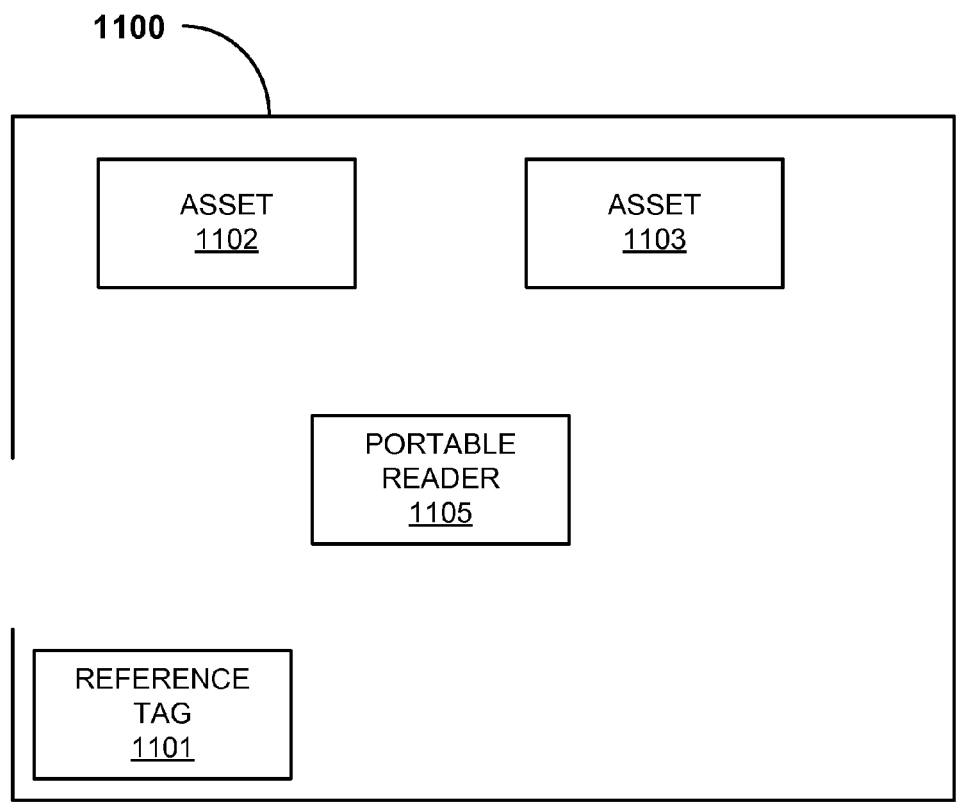
FIG. 11 shows an example of locating and reporting assets in accordance with another embodiment.

FIG. 11 shows an example of locating and reporting assets in accordance with another embodiment. In the embodiment of FIG. 11, a reference tag 1101 is located in room 1100. In accordance with one embodiment, a tag (e.g., an RFID tag, WiFi tag, RuBee tag, etc.) can be assigned an object type of "reference tag." In accordance with various embodiments, a reference tag is permanently situated at a fixed location such as room 1100. Again, it is noted that reference tags are not restricted to indoor locations alone and can also be located outdoors. In accordance with various embodiments, the location at which reference tag 1101 is situated is stored in kinematic asset management platform 150. In the embodiment of FIG. 11, assets 1102 and 1103 are also currently located in room 1100. In accordance with one embodiment, a portable reader 1105 can be used to read all of the tags such as reference tag 1101, as well as respective asset IDs tags coupled with assets 1102 and 1103, which it can detect in room 1100. Portable reader 1105 can record, or report the presence of all tags detected in room 1100. Thus, the location of assets 1102 and 1103 is reported by association due to their presence being detected in the same room as, or proximate to, reference tag 1101.

Embodiments of the present technology are thus described. While the present technology has been described in particular embodiments, it should be appreciated that the present technology should not be construed as limited to these embodiments alone, but rather construed according to the following claims.

What is claimed is:

1. A method for managing kinematic assets, said method comprising:
    associating an identification device with an asset, said identification device comprising a unique identification;
    establishing an association between said unique identification and a second unique identification of a fixed location;
    maintaining a fixed location inventory comprising said asset by a reader node disposed within said fixed location;
    transferring said asset from said fixed location inventory to a mobile location inventory maintained by a second reader node disposed within a mobile location;
    detecting said unique identification using a reader disposed within said mobile location;
    reporting said fixed location inventory to a kinematic asset management platform when said asset has been removed from said fixed location; and
    reporting said mobile location inventory to said kinematic asset management platform when said asset has been added to said mobile location inventory.

2. The method recited in claim 1 further comprising:
    reporting said fixed location inventory and said mobile location inventory to said kinematic asset management platform; and
    storing said fixed location inventory and said mobile location inventory by said kinematic asset management platform.

3. The method recited in claim 2 further comprising:
    simultaneously detecting by said reader disposed within said mobile location and a second reader, disposed within said fixed location, the presence of said asset; and
    receiving by said kinematic asset management platform a first report from said mobile location of the detection of said asset by said mobile location and a second report by said fixed location of the detection of said asset by said fixed location.

4. The method of claim 3 further comprising:
determining by said kinematic asset management platform that said asset is assigned to said mobile location;
receiving in said report a location of said mobile location when said asset is detected; and
disregarding said second report by said fixed location of the detection of said asset by said fixed location when reporting the location of said asset.

5. The method of claim 3 further comprising:
determining by said kinematic asset management platform that said asset is assigned to said fixed location; and
disregarding said report by said mobile location of the detection of said asset by said mobile location when reporting the location of said asset.

6. The method of claim 1 further comprising:
determining a direction of travel of said asset by a plurality of readers coupled with said reader node;
reporting said direction of travel within said fixed location to said kinematic asset management platform;
determining by a kinematic asset management platform that said asset has been removed from said fixed location based at least in part upon said direction of travel of said asset within said fixed location; and
determining that said asset is within said mobile location based upon a report conveying to said kinematic asset management platform of the detection of said asset by at least one reader disposed within said mobile location.

7. The method recited in claim 1 further comprising:
using a Global Navigation Satellite System (GNSS) receiver coupled with said mobile location to determine the location of said asset; and
conveying said location of said asset during said reporting of said mobile location inventory.

8. A system for managing kinematic assets comprising:
an identification device comprising a unique identification coupled with an asset said identification device comprising a unique identification;
a kinematic asset management platform which establishes an association between said unique identification and a second unique identification of a fixed location;
a reader node disposed within said fixed location which maintains an inventory comprising said asset and which reports said inventory to a kinematic asset management platform when said asset has been removed from said fixed location; and
a second reader node disposed within a mobile location wherein said asset is added to a second inventory maintained by said second reader node when said asset is transferred to said mobile location and wherein said second reader node reports said second inventory to said kinematic asset management platform when said asset has been added to said second inventory.

9. The system of claim 8 further comprising:
a plurality of readers coupled with said reader node for determining a direction of travel of said asset; and
a wireless transceiver for reporting said direction of travel within said fixed location to said kinematic asset management platform and wherein said wireless transceiver determines that said asset has been removed from said fixed location based at least in part upon said direction of travel of said asset within said fixed location and determines that said asset is within said mobile location based upon a report conveying to said kinematic asset management platform of the detection of said asset by at least one reader disposed within said mobile location.

10. The system recited in claim 8 wherein said kinematic asset management platform stores said inventory and said second inventory.

11. The system recited in claim 10 further comprising:
a Global Navigation Satellite System (GNSS) receiver coupled with said mobile location to determine the location of said asset and wherein said second reader node conveys said location of said asset during said reporting of said second inventory.

12. The system of claim 11 wherein said kinematic asset management platform is adapted to determined that said asset is assigned to said mobile location, receive in said report a location of said mobile location when said asset is detected, and disregard a second report by said fixed location of the detection of said asset by said fixed location when reporting the location of said asset.

13. The system of claim 8 wherein said kinematic asset management platform is adapted to determine that said asset is assigned to said fixed location and then disregard a report by said mobile location of the detection of said asset by said mobile location when reporting the location of said asset.

* * * * *